(12) United States Patent
Atkinson et al.

(10) Patent No.: US 12,511,973 B2
(45) Date of Patent: Dec. 30, 2025

(54) CONTROLLING ROULETTE HIGHLIGHT FEATURES

(71) Applicant: LNW Gaming, Inc., Las Vegas, NV (US)

(72) Inventors: Lyal Atkinson, Mascot (AU); William Jones, Boulder, CO (US)

(73) Assignee: LNW Gaming, Inc., Las Vegas, NV (US)

( * ) Notice: Subject to any disclaimer, the term of this patent is extended or adjusted under 35 U.S.C. 154(b) by 330 days.

(21) Appl. No.: 17/948,633

(22) Filed: Sep. 20, 2022

(65) Prior Publication Data

US 2023/0096360 A1 Mar. 30, 2023

Related U.S. Application Data

(60) Provisional application No. 63/312,669, filed on Feb. 22, 2022, provisional application No. 63/249,695, filed on Sep. 29, 2021.

(51) Int. Cl.
*G07F 17/32* (2006.01)
*A63F 5/04* (2006.01)
*G06F 7/58* (2006.01)

(52) U.S. Cl.
CPC ............ *G07F 17/3213* (2013.01); *A63F 5/04* (2013.01); *G06F 7/588* (2013.01); *G07F 17/3209* (2013.01); *G07F 17/323* (2013.01); *G07F 17/3262* (2013.01); *G07F 17/3267* (2013.01); *G07F 17/3288* (2013.01)

(58) Field of Classification Search
CPC ............ G07F 17/3213; G07F 17/3209; G07F 17/323; G07F 17/3262; G07F 17/3267; G07F 17/3288; G06F 7/588; A63F 5/04
See application file for complete search history.

(56) References Cited

U.S. PATENT DOCUMENTS

| | | | |
|---|---|---|---|
| 4,869,505 A | * | 9/1989 | Manabe ............... G07F 17/3262 273/142 E |
| 5,540,442 A | | 7/1996 | Orselli et al. |
| 5,902,184 A | | 5/1999 | Bennett |
| 7,727,061 B2 | | 6/2010 | Taylor |
| 8,002,629 B2 | | 8/2011 | Bennet et al. |
| 8,337,289 B2 | | 12/2012 | Bartosik |
| 9,600,974 B2 | | 3/2017 | Yee et al. |

(Continued)

FOREIGN PATENT DOCUMENTS

WO WO2000033269 6/2000

OTHER PUBLICATIONS

"G4 Organic Catalogue," Elektroncek d.d, (Oct. 2010).

*Primary Examiner* — Kevin Y Kim

(57) ABSTRACT

A method and/or system to perform operations associated with a roulette game. The operations include detecting, by a processor, a position at which a token is placed upon a betting layout for a roulette game and accepting the token as a bet for the roulette game. The operations can further include determining, by the processor based on the position, a bet type for the bet. The operations can further include selecting, by the processor based on the bet type, a highlight effect from a plurality of different highlight effects. The operations can further include animating, by the processor, the highlight effect on one or more portions of a roulette wheel associated with one or more bet-upon values for the bet type.

21 Claims, 17 Drawing Sheets

(56) References Cited

U.S. PATENT DOCUMENTS

| | | |
|---|---|---|
| 10,629,024 B1 | 4/2020 | Haushalter |
| 11,011,014 B1 | 5/2021 | Haushalter |
| 2003/0023735 A1* | 1/2003 | Funahashi ............... G07F 17/32 |
| | | 709/229 |
| 2003/0071417 A1 | 4/2003 | Webb |
| 2008/0248853 A1 | 10/2008 | Kido |
| 2009/0108526 A1 | 4/2009 | Moody |
| 2010/0331070 A1* | 12/2010 | Bartosik ............ G07F 17/3213 |
| | | 273/142 E |
| 2011/0180991 A1 | 7/2011 | Hsu |
| 2016/0019744 A1* | 1/2016 | Pagano ............... G07F 17/3204 |
| | | 463/17 |

\* cited by examiner (HIGHLIGHTED BET TYPE: STRAIGHT UP)

(HIGHLIGHTED BET TYPE: SPLITS)

(HIGHLIGHTED BET TYPE: BLACK)

(HIGHLIGHTED BET TYPE: RED)

(HIGHLIGHTED BET TYPE: TIERS)

(HIGHLIGHTED BET TYPE: ORPHELINS)

(HIGHLIGHTED BET TYPE: GRAND SERIES)

(HIGHLIGHTED BET TYPE: ZERO SPIEL)

(HIGHLIGHTED BET TYPE: FIRST TWELVE)

CONTROLLING ROULETTE HIGHLIGHT FEATURES

CROSS-REFERENCE TO RELATED APPLICATIONS

This application claims the priority benefit of U.S. Provisional Patent Application No. 63/249,695 filed Sep. 29, 2021 and U.S. Provisional Patent Application No. 63/312,669 filed Feb. 22, 2022, which 63/249,695 application and 63/312,669 application are each incorporated by reference herein in their respective entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD

The present disclosure relates generally to gaming systems, apparatus, and methods and, more particularly, to presentation and control of roulette games.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

Roulette is a well-known casino game which has been played for many years. A typical conventional roulette game includes a table bearing a felt covering upon which indicia forming a betting layout has been silk-screened or otherwise imprinted. A typical roulette wheel includes a number ring bearing a circular array of numbered segments bearing number values (or number indicia) "1" through "36." The numbered segments may also be referred to as "pockets" as they each include a recessed portion, or "pocket," into which a roulette ball can come to rest as a spin outcome for the game. The betting layout has individual betting spots that correspond to (and indicate) the number values. In addition to the number values "1" through "36," the number ring (and corresponding betting layout) typically includes one or more additional number values (or number indicia) such as "0" or "00." For example, a first version of roulette (called the "European" version) includes only the single "0" value on the roulette wheel and the betting layout whereas another version (called the "American" version) includes both the "0" and the "00" on the roulette wheel and the betting layout. Typically, for the American version, the "0" and the "00" are disposed at diametrically opposite locations on the number ring of the roulette wheel. The numbers values "1" through "36" are not disposed in numerical order, but are typically disposed in a predetermined arrangement based on the version of roulette being played. For example, the predetermined arrangement of the number values on the roulette wheel vary in their placement between the American version and the European version. The betting layouts may also appear different for the different versions of the game.

Furthermore, both the roulette wheel segments and/or betting spots on the betting layout that correspond to the number values typically bear the alternating colors of red and black, with the exception of the "0" and "00" number values, whose wheel segments and/or betting spots are typically colored green. A ring of pockets corresponding in number to the plurality of numbers of the circular number ring lies adjacent, but radially inward of the number ring, on the typical roulette wheel. In addition, a typical roulette wheel includes a circular, inclined ball track, disposed above, and radially outwardly of the number ring.

In operation of a typical roulette game, players place chips or tokens on the betting layout located on the roulette table, and then the dealer (referred to as a "croupier" in roulette) spins the roulette wheel to place the ball in motion about the circular ball track. As the roulette wheel slows, the ball moves radially inwardly and comes to rest in one of the pockets associated with a particular one of the numbers of the number ring. After the ball comes to rest in one of the pockets, the croupier or dealer settles the various wagers placed on the table layout in accordance with predetermined rules and wager odds.

A significant technical challenge with some games, including roulette, is to provide a new and improved level of game play that uses new or improved gaming apparatus animations. Animations represent improvements to the underlying technology or technical field of gaming apparatus and, at the same time, have the effect of encouraging prolonged and frequent player participation.

SUMMARY

According to one aspect of the present invention, a method and/or system is described herein to perform operations associated with a roulette game. In one embodiment, the operations include detecting, by a processor, a position at which a token is placed upon a betting layout for a roulette game and accepting the token as a bet for the roulette game. The operations can further include determining, by the processor based on the position (at which token was placed), a bet type for the bet. The operations can further include selecting, by the processor based on the bet type, a highlight effect from a plurality of different highlight effects. The operations can further include animating, by the processor, the highlight effect on one or more portions of a roulette wheel associated with one or more bet-upon values for the bet type.

In another embodiment, the operations include selecting, via a random number generator, a set of multiplier levels for a roulette game. The roulette game is associated with a plurality of terminals. The operations further include selecting one or more sets of random layout values from a betting layout for the roulette game, and pairing, based on multiplier-level type, each member of the set of multiplier levels with at least one of the one or more sets of random layout values. The operations further include animating, via one or more displays associated with the plurality of terminals, a highlight effect for each pair that occurs from the pairing of the each member of the set of multiplier levels with the at least one of the one or more sets of random layout values.

Additional aspects of the invention will be apparent to those of ordinary skill in the art in view of the detailed description of various embodiments, which is made with reference to the drawings, a brief description of which is provided below.

Figure 1:
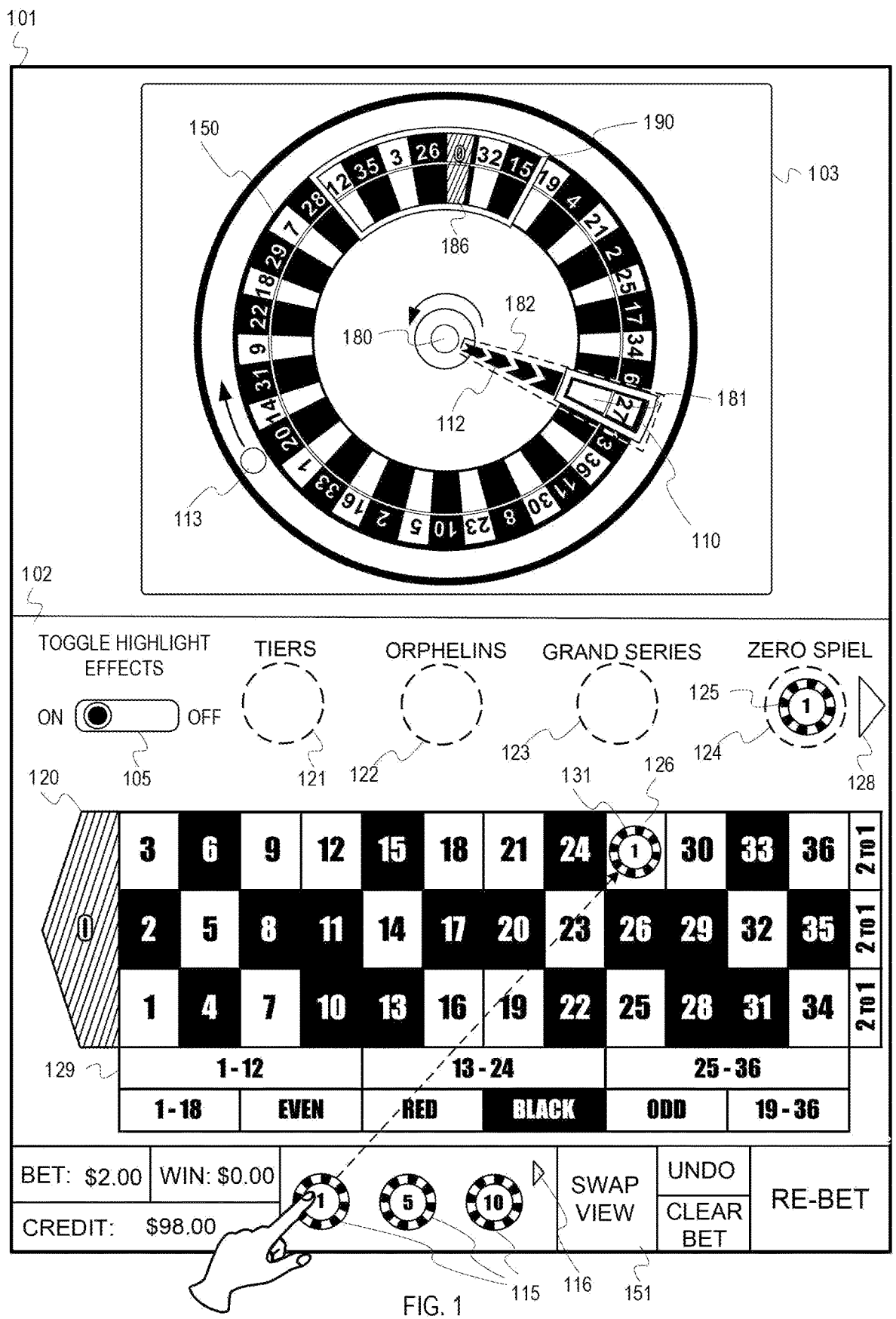
FIG. 1 is a diagram of controlling roulette highlight features according to at least some aspects of the disclosed concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

FIG. 1 is a diagram of controlling roulette highlight features according to at least some aspects of the disclosed concepts. In some embodiments, such as those described for FIG. 1, The generic use of the term "processor" may refer to any one of, or any combination of, the example processors described herein or some other processor or combination of processors that collectively and/or concurrently perform operations. The processor can be either internal to, or external to a gaming terminal 101. The processor associated with gaming terminal 101 performs various operations related to the roulette game. The processor may, for example, be control processor 1197 described for FIG. 11. The processor may be associated with game engine 1210 described in FIG. 12. In another example, the processor may be included in user device 1320 or in one of the servers of the game system 1300 described in FIG. 13. In yet another example, the processor may be processor 1142 described in FIG. 11.

Still referring to FIG. 1, the gaming terminal 101 includes a user interface 102 and a display 103. On the user interface 102 are controls, settings, objects, etc. that a player interacts with during a game of roulette. The user interface 102 includes a betting layout 120 for placement of one or more bets. In one example, the user interface 102 includes a plurality of different virtual tokens 115 of differing denomination values (e.g., a 1, 5, 10, etc.). While only three values are shown, other denomination values may be included (e.g., 20, 25, 50, 100, etc.). In some embodiments, the other virtual tokens may be accessible via a user-interface object (e.g., via scroll control 116). In other embodiments, the ranges of denomination values may be automatically set based on other game factors, such as for a betting tier associated with multiplier ranges (e.g., see FIGS. 3 and 4 for more details).

A player can drag one or more of the virtual tokens onto one or more positions on the betting layout 120 associated with a betting spot for a specific type of bet. When the player releases the drag-and-drop feature (e.g., when the player lifts their finger off of the user interface 120), the bet is placed. Once the croupier calls an end to betting, because the virtual token is in a betting spot, the bet is accepted for a bet type associated with the betting spot. The processor then locks the position of the virtual token in place onto the betting layout 120.

The betting layout 120 is configured for placement of various types of bets, such as a single-value bet type or a multi-value bet type. A single-value bet type involves a bet on an individual (single) value associated with the betting layout 120, such as the number "27" on which a player has made a "straight up" bet. A multi-value bet type involves a bet on a group of values associated with the roulette wheel. For example, a multi-value bet type can include an outside bet (e.g., a bet from the outside bet section 129). The outside bet section 129 includes various types of multi-value bets, such as red/black bet, an odd/even bet, a high/low bet, a column bet, a dozens bet, etc. A multi-value bet type can also include an inside bet other than a straight-up bet, such as a split bet, a street bet, a corner bet, a line bet, a five-number bet, a basket bet, a snake bet, etc.). Split bets, for example, are placed on borders between, or connecting points of, the betting spots of individual values. The position of placement of the split bet thus straddles the number values on the betting layout 120 and indicates a multi-value bet on the group of number values that the virtual token straddles. Hence, the betting spots for split bets include the given border on which the virtual token is placed. The multi-value bet type can also include "call" type bets, such as a Voisins du Zero bet, a Jeu Zero bet, a Tiers du Cylindre bet (or "Tiers" bet), an Orphelins bet, a Neighbors bet, a Grand Series bet, a Zero Spiel bet, etc. The betting layout can also include additional betting spots (e.g., betting spots 121, 122, 123, and 124) which are related to the call type bets. For example, a first betting spot 121 is for placement of the Tiers bet. A second betting spot 122 is for placement of the Orphelins bet. A third betting spot 123 is for placement of the Grand Series bet. A fourth betting spot 124 is for placement of the Zero Spiel bet. The betting spots 121, 122, 123, and 124 are only examples of betting spots for some types of call bets. The betting layout 1320 can include additional betting spots for additional types of call bets or other types of bets, such as a Final Bet, a Complete Bet, an Imprisonment Bet, etc. The additional types of bets can be accessed via a user interface object, such as via a selection of a scroll control 128, or via a selection of a "Swap View" button 151.

In some embodiments, the processor can present one or more betting layouts via the user interface 102. The processor can swap views of different betting layouts (e.g., via selection of the "Swap View" button 151) or can change presentation of parts of the betting layout 120 (e.g., via selection of scroll control 116 or scroll control 128). The different betting layouts (or modified betting layouts) present additional possible bet types (e.g., additional types of call bets, or various customized type bets not shown). In some instances, the different betting layouts may include custom types of bets, or customized selections of a set of bet types. Thus, if a user wants to repeatedly bet on the same values from one of the betting layouts, and/or on the same set of bet types, the user can store the customized information in a memory associated with a user account. For instance, the processor can present a feature to save a customized set, or rather a user-selected, custom set of bet-upon values associated with a set of given bet types. The processor can store the customized set (along with coordinates of the betting spots) into a user account associated with the player. A player can log in to the gaming terminal 101 using a player loyalty account which includes a certain amount of memory related to customized information. The customized information can be related to customized bets (e.g., customized selections of various bet types), customized selections of layouts (e.g., a standard layout, a racetrack type layout, etc.), or customized settings for other features, such as customized settings for eligible multiplier ranges and/or betting tiers (e.g., see FIG. 4 for more details related to eligible multiplier ranges and/or betting tiers). When the player selects the stored customized information, the processor can load an appropriate betting layout as well as automatically position virtual tokens (of a pre-selected value) to be positioned onto custom-selected betting spots.

As shown in FIG. 1, a single-value bet type, or "straight up" bet is made on the number "27." The processor determines that the single-value bet type is made in response to detecting a position at which a token 131 is placed on the betting layout 120. For example, the processor detects that the token 131 is placed inside a betting spot 126 associated with the individual value "27" on the layout 120 (the value "27" on the betting layout 120 is covered by the token 131 and therefore is not visible on the betting layout 120 as shown in FIG. 1). The processor can detect whether the placement of the token 131 is fully within the betting spot 126 or if overlaps the borders of betting spot 126. If the token 131 were overlapping, or touching, borders of the betting spot 126, then the processor determines that the bet type is a specific type of multi-value bet called a "split" bet which selects as the multi-value type bet all number values that the token 131 touches.

The processor illustrates (via the display 103) the bet type being selected using a highlight effect. The processor presents the highlight effect on one or more portions (i.e., on various segments) of the roulette wheel 150 that correspond to the selected bet-upon values from the betting layout 120. The processor selects and/or animates different highlight effects for different bet types. For example, the processor utilizes different highlight effects for single-value bet types versus multi-value bet types. For instance, as shown in FIG. 1, a player input placed a token 125 on the betting spot 124 related to the Zero Spiel bet type. The Zero Spiel bet type includes a bet on the "0" value as well as a known grouping of values (i.e., "12," "35," "3," "26," "32," and "15") on the roulette wheel 150 that surround a pocket 186 for the "0" value. Furthermore, an additional player input places the token 131 within the betting spot 126. The processor utilizes different types of highlight effects for the different types of bets. In response to placement of the token 125 for the Zero Spiel bet type, the processor illustrates a first type of highlight effect (e.g., highlight effect 190) which appears as a border that which surrounds at least a portion of the pockets for the bet-upon values "12," "35," "3," "26," "0," "32," and "15" (which are associated with the Zero Spiel bet). On the other hand, in response to placement of the token 131 for the straight-up bet type, the processor illustrates a second type of highlight effect (e.g., highlight effect 112) which appears an arrow-type highlight effect that points to a pocket 181 for the bet-upon value "27."

In some embodiments, the processor selects a type of highlight effect that relates to some aspect of the bet type and/or that indicates a difference in bet types or differences in degrees of payouts for the particular bet types. For example, a single-value bet type (e.g., a straight-up bet) offers higher payout odds for a single selected number value as opposed to multi-value bet type which provides lower odds of payout for each respective one of the multiple number values associated with the multi-value bet type. Thus, the processor can select the arrow-type highlight effect (e.g., highlight effect 112) for the straight-up bet, to cause it to stand out more than a border-type highlight effect (e.g., highlight effect 190). In some embodiments, the processor can also present a border-type highlight effect for a single-value bet type, such as highlight effect 110 which surrounds a specific portion of the pocket 181 related to the value "27."

In another example, the processor utilizes different colors as highlight effects for the different bet types. For instance, the processor uses different colors to represent the different bet types. For example, the processors animates the highlight effects 110 and 112 with a different color than the highlight effect 190. For example, the processor colors at least some portion of the highlight effect 190 as green, while concurrently the processor colors at least some portion of the highlight effects 110 and/or 112 as gold. Furthermore, each of the different types of multi-value bets can have a different color (or other different kinds of distinguishing characteristic, such as different shapes, patterns, gradients, actions, etc.).

In some embodiments, the processor can illustrate the bet type on the roulette wheel 150 as the bet is being selected (e.g., when a token hovers over a given position before being released). For instance, when a player positions their finger over one of the instance of tokens 115 and drags the finger to the betting spot 126, the processor tracks the position of the token 131. In response to detecting the position of the token 131 in the betting spot 126 the processor selects and illustrates the highlight effect 112 (and highlight effect 110) on the portion(s) of the roulette wheel 150 that are associated with the pocket 181 related to the value "27" from the betting spot 126. The portion(s) of the roulette wheel 150 that are associated with the pocket 181 may include any portion of the roulette wheel 150 within the area 182. The area 182 is a slice of the roulette wheel 150 extending from (or near) a center point 180 of the roulette wheel 150 up to, the pocket 181 including and/or surrounding the value "27." The highlight effect 112 includes arrow graphics that point to the pocket 181. The highlight effect 110 surrounds the pocket 181 and the value "27." Furthermore, the highlight effect 112 can be dynamic and can move (e.g., as if the arrow graphics move in waves from (or near) the center point 180 to the pocket 181). The processor animates the highlight effects 110 and 112 as the finger of the player (i.e., the player input) is still touching the betting layout 120. The processor detects when the player releases their finger from the betting layout 120 (i.e., when the player releases the drag-and-drop function for the token 131 by lifting up their finger). In response to detecting the finger release over an available betting spot, the processor determines that the bet is placed and, hence, the processor locks in the highlight effects 110 and 112 onto the roulette wheel 150. The highlight effects 110 and 112 remain on (e.g., remain overlaid onto) the roulette wheel 150 throughout the remainder of the game, such as when the roulette wheel 150 spins and/or after an outcome of the roulette game occurs (e.g., as a roulette ball 113 comes to rest within one of the pockets on the roulette wheel 150). The bet can still be removed or modified before a croupier closes the betting. If, for example, the player input dragged-and-dropped the token 131 away from the betting spot 126 while betting is still allowed, then the processor removes the highlight effects 110 and 112 from the roulette wheel 150. Thus, a highlight effect (e.g., highlight effects 110 and 112) that indicates a bet or a bet position can be displayed before and after a betting cycle is called to an end by the croupier. A multiplier effect (e.g., see FIGS. 3 and 4 for more details) is displayed after a betting cycle is called to an end.

Figure 2:
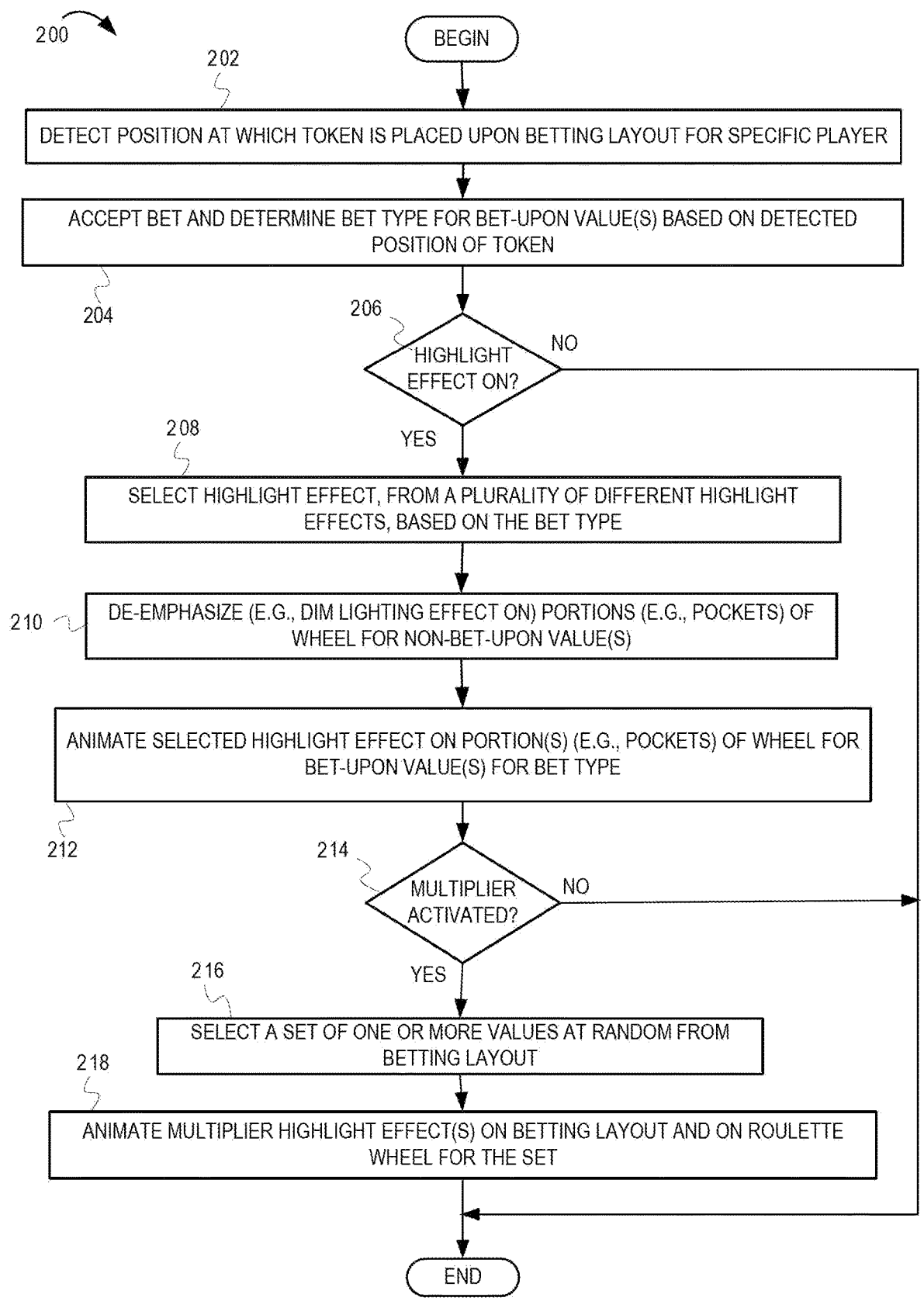
FIG. 2 is a flowchart for controlling roulette highlight features according to at least some aspects of the disclosed concepts.

FIG. 2 is a flowchart for controlling roulette highlight features according to at least some aspects of the disclosed concepts. FIG. 3, FIG. 4, FIG. 11, FIG. 6A, FIG. 6B, FIG. 7A, FIG. 7B, FIG. 8A, FIG. 8B, FIG. 9A, FIG. 9B, and FIG. 10 are diagrams of bet type roulette highlight features according to at least some aspects of the disclosed concepts. FIG. 3, FIG. 4, FIG. 11, FIG. 6A, FIG. 6B, FIG. 7A, FIG. 7B, FIG. 8A, FIG. 8B, FIG. 9A, FIG. 9B, and FIG. 10 will be referred to concurrently with the description of the flow 200 of FIG. 2.

Figure 3:
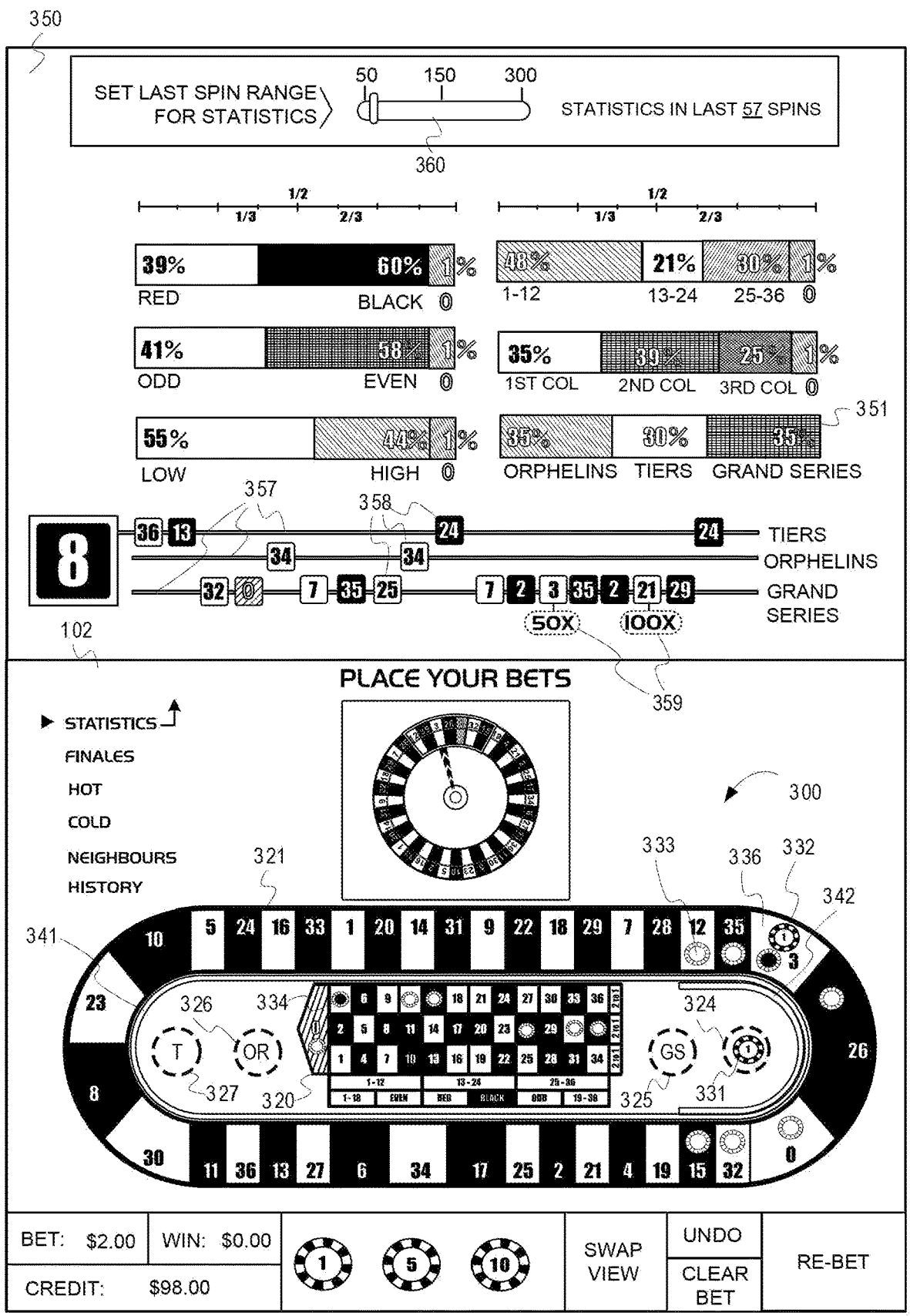
FIG. 3 is a diagram of controlling roulette highlight features in response to receiving touch input according to at least some aspects of the disclosed concepts.

In FIG. 2, at processing block 202 of flow 200, a processor (associated with a gaming terminal) detects a position at which a token is placed, by a specific player, upon a betting layout for a roulette game. For example, as described in connection with FIG. 1, the processor detected the position upon which tokens 131 and 125 were placed on the betting layout 120. FIG. 3 shows a different type of betting layout 300 upon which tokens can be positioned. The betting layout 300 includes an inner betting layout 320 surrounded by an outer, racetrack-type betting layout 321. The betting layout 300 also includes betting spots 324 for specific multi-value type bets, such call bet types. In some embodiments, the betting spots 324 are similar to (e.g., equivalent to) the betting spots 121, 122, 123, and 124 described from FIG. 1. As shown in FIG. 3, the processor detects that a token 331 is placed upon one of several different betting spots 324. For instance, the processor detects that the token 331 is placed upon a betting spot associated with the Zero Spiel bet type. Furthermore, the processor detects that an additional token 332 is placed on a betting spot 336 as a straight-up bet on the value "3."

Referring momentarily back to FIG. 2, the flow 200 continues at processing block 204, where the processor accepts each bet and determines a bet type for each bet-upon value(s) based on the detected position of the token(s). For example as shown in FIG. 1, the processor accepted the Zero Spiel bet for placement of the token 125 at the position of the betting spot 124 and also accepted the straight-up bet for placement of the token 131 on the betting spot 126. In the example shown in FIG. 3, the processor accepts the Zero Spiel bet for placement of the token 331 and the processor accepts the straight-up bet for the placement of the token 332.

Figure 6A:
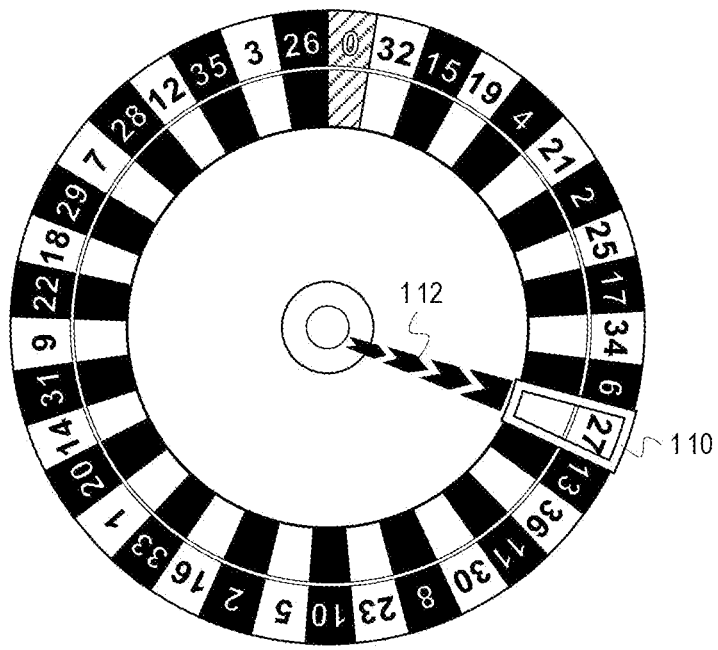
FIG. 6A is a diagram of a roulette highlight feature for a single-value bet type according to at least some aspects of the disclosed concepts.

Referring momentarily back to FIG. 2, the flow 200 continues at processing block 206 where the processor determines whether the highlight effect feature is turned on. For instance, referring momentarily to FIG. 1, the processor determines whether a switch 105, on the user interface 102, is turned on. In response to the processor determining that the highlight effect feature is turned off, the flow 200 ends. In response to the processor determining that the highlight effect feature is turned on, the flow 200 continues at processing block 208 where the processor selects, based on the bet type, a highlight effect from a plurality of different highlight effects. For example, the processor searches a data store (e.g., storage device 1148 shown in FIG. 11) and detects (via a database relationship) that the Zero Spiel bet type is associated with the color green and/or is related to a border-type highlight effect. Similarly, the processor detects (via the database relationship) that the straight-up bet is associated with the color white and/or an arrow type highlight effect as well as a border-type highlight effect. FIG. 6A illustrates one example of the highlight effect 112 and the highlight effect 110 for a straight-up bet where the highlight effect 110 is colored white and is a border-type highlight effect and the highlight effect 112 is an arrow type highlight effect, similar to the embodiment(s) described for FIG. 1.

Referring momentarily back to FIG. 2, the flow 200 continues at processing block 210 where the processor deemphasizes one or more portions of the roulette wheel associated with non-bet-upon value(s). In some embodiments, the processor highlights bet upon pockets while deemphasizing the non-bet upon pockets. For example, the processor dims a lighting effect (e.g., dims colors, vibrancy, etc.) on non-bet-upon pockets. In some embodiments, for the bet-upon pockets, the processor enhances the colors of the numbers, the colors of the borders, and the colors of the pocket background (e.g., either red, black, or green background pocket colors), etc. For example, in one embodiment, the processor increases the brightness of the colors, enhances the contrast, increases vibrancy, etc. for the bet-upon pockets, while concurrently the processor mutes the colors, decreases the brightness, reduces a contrast, decreases a vibrancy, etc., for the non-bet-upon pockets.

Referring momentarily back to FIG. 2, the flow 200 continues at processing block 212 where the processor animates the selected highlight effect on one or more portions of a roulette wheel associated with one or more bet-upon values for the bet type. In some embodiments, the processor animates the selected highlight effect as a graphical overlay onto a graphical depiction of the roulette wheel. The processor renders the graphics for the game and also renders the highlight effects. In some embodiments, the processor knows the dimensions of the virtual roulette wheel. Thus, the processor can render (e.g., shape and/or position) animations of selected highlight effects on one or more graphical layers that overlay a graphical image of the roulette wheel. The processor uses the known dimensions of the virtual roulette wheel and the known position of coordinates of the borders of the pockets to position the highlight effects (while the roulette wheel is spinning or at rest).

Figure 9A:
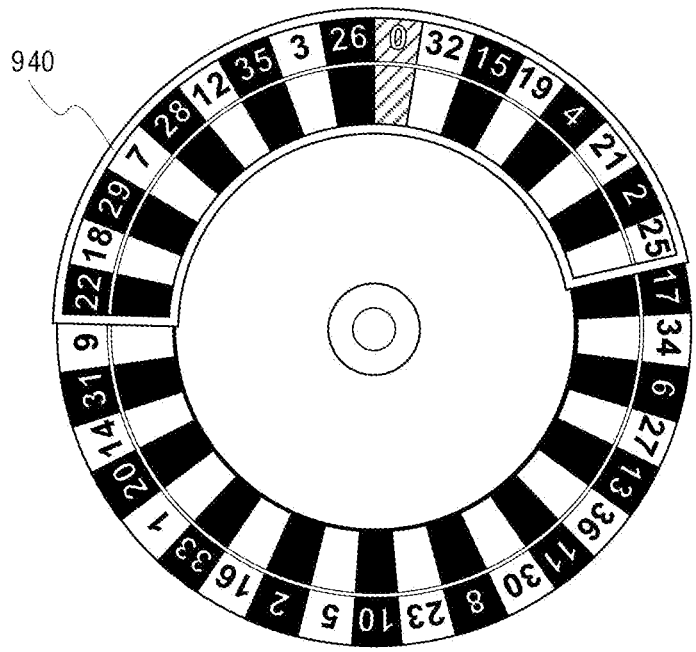
Figure 9B:
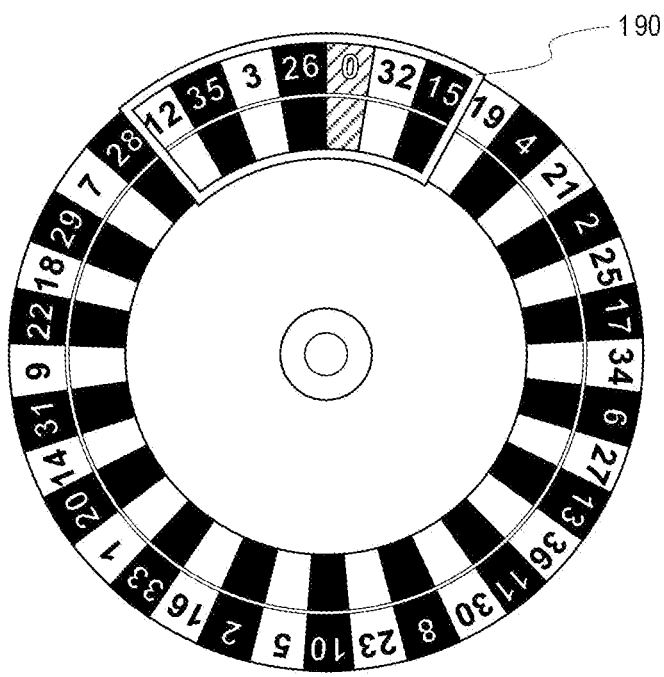

In some embodiments, the processor animates a border-type highlight around sections on the roulette wheel that correspond to a plurality of bet-upon values for the multi-value bet. For example, as shown in FIG. 1, the processor animates the highlight effect 190 as a border-type highlight that surrounds a section of the roulette wheel 150 that includes the group of values "12," "35," "3," "26, "0," "32," and "15." FIG. 9B illustrates the highlight effect 190 in greater detail.

Figure 8A:
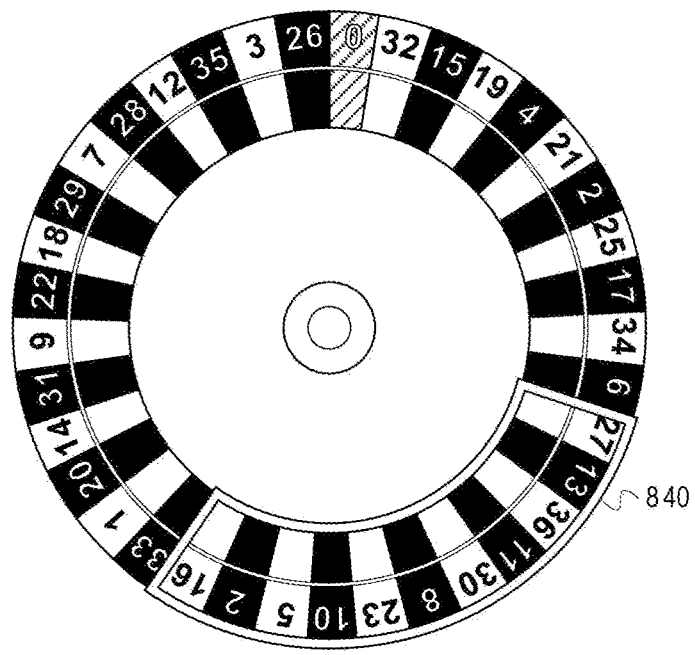

In some embodiments, the processor animates a border-type highlight around contiguous sections of the roulette wheel. For example, FIG. 9B shows one example of the highlight effect 190 around the contiguous pockets related to bet-upon values for the Zero Spiel bet type. FIG. 8A illustrates an example of a border-type highlight 840 around the contiguous pockets related to bet-upon values for the Tiers type bet (i.e., around the values "27," "13," 36," 11," "30," "8," "23," "10," "5," "2," and "16). FIG. 9A shows another example of a border-type highlight effect 940 around the contiguous pockets related to bet-upon values for the Grand Series bet type.

Figure 6B:
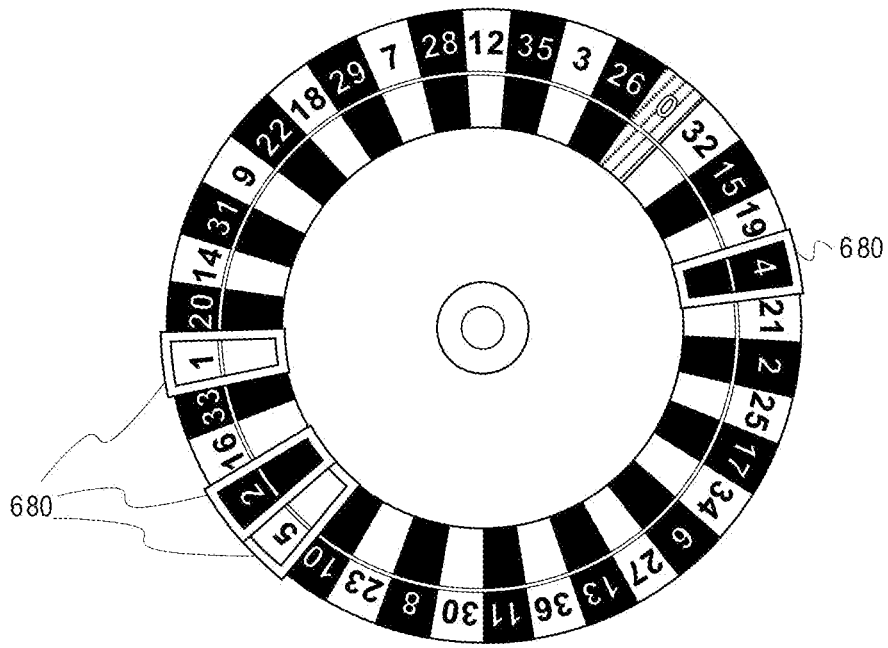
FIGS. 6B, 7A, 7B, 8A, 8B, 9A, 9B, and 10 are diagrams of roulette highlight features for multi-value bet types, according to at least some aspects of the disclosed concepts.
Figure 7A:
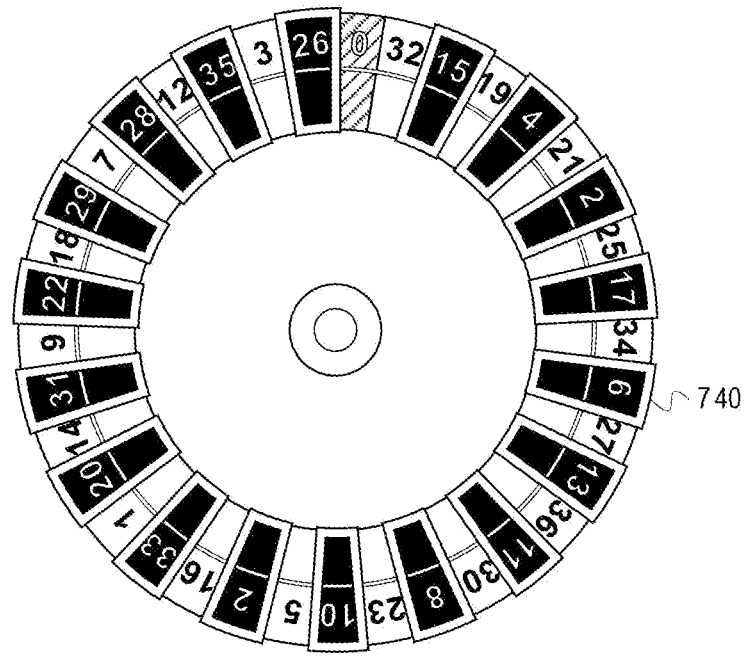
Figure 7B:
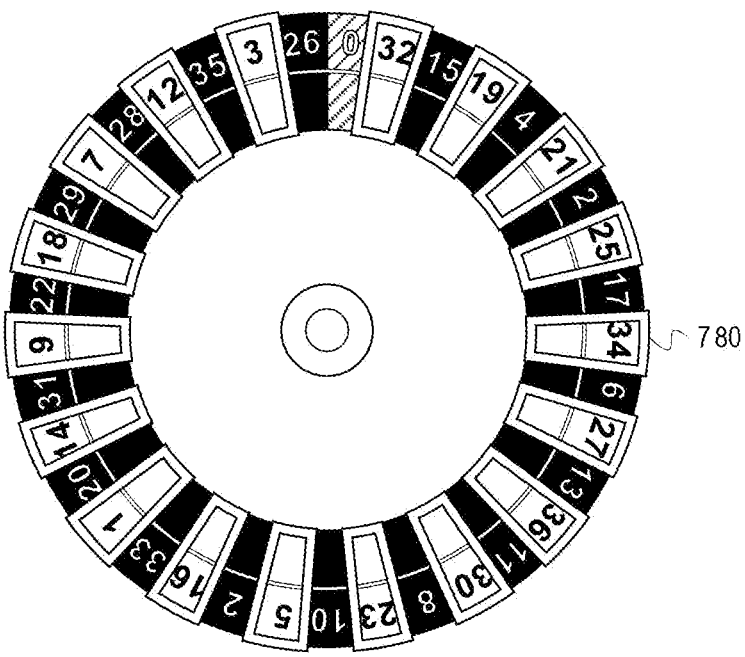
Figure 8B:
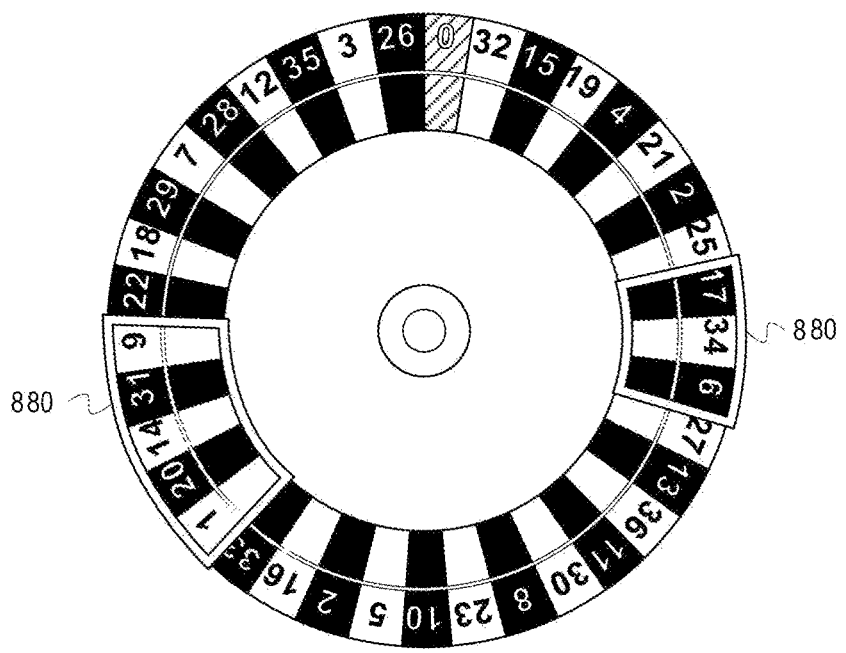
Figure 10:
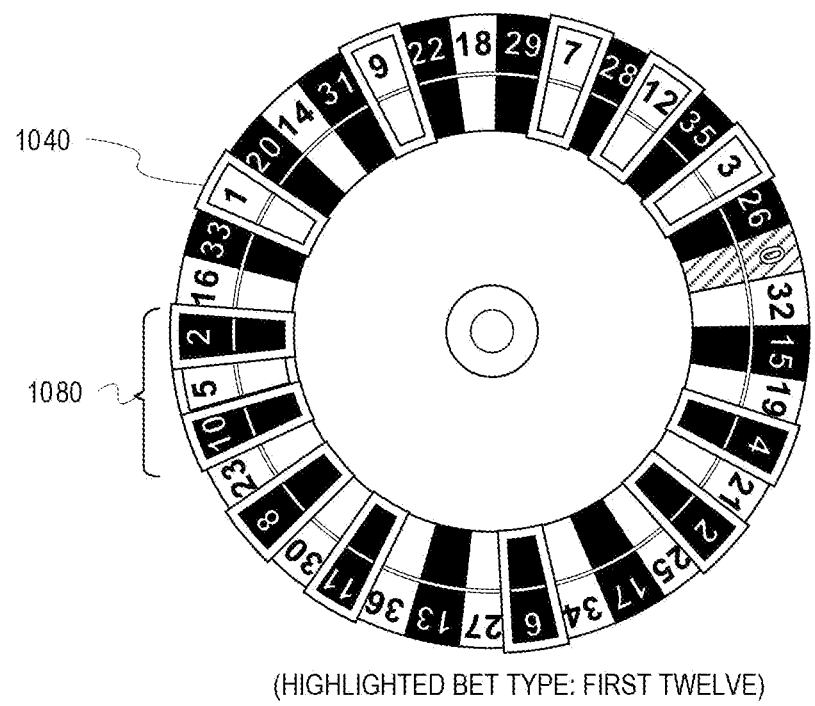

In some embodiments, the processor animates a border-type highlight around non-contiguous sections of the roulette wheel. For example, as shown in FIG. 8B, highlight effects are shown for the Orphelins bet type. The Orphelins bet type includes two groups of bet-upon values. The first group of bet-upon values includes the values "1," "20," "14," "31," and "9" collectively. The second group of bet-upon values includes the values "17," "34," and "6" collectively. However, the respective portions (e.g., groups of pockets) for the two groups of values are on separate non-contiguous sections of the roulette wheel. Therefore, the processor presents separate instances of the highlight effects 880 only around the non-contiguous groups of pockets for the two groups. The two instances of the highlight effect 880 have the same distinguishing characteristic (e.g., they are both colored light blue, which represents the Orphelins bet type). The processor also animates non-contiguous pockets for other multi-value type bets. For instance, as shown in FIG. 6B, the processor animates the highlight effect 680 on non-contiguous pockets (e.g., related to values "4" and "1") as well as on contiguous pockets (e.g., related to values "5" and "2"). As shown in FIG. 7A, the processor animates a highlight effect 740 on non-contiguous pockets for values related to only black-colored betting spots (i.e., for the "black" multi-value bet type). As shown in FIG. 7B, the processor animates a highlight effect 780 on non-contiguous pockets for values related to only red-colored betting spots (i.e., for the "red" multi-value bet type). As shown in FIG. 10, the processor animates border-type highlights around the individual values of a bet type called First Twelve, which includes the values from "1" to "12" on the roulette wheel.

The processor can further animate contiguous pockets differently based on the bet type. For example, in some embodiments, the processor determines whether to animate one border around a group of contiguous pockets or whether to animate separate borders around each member of a group of contiguous pockets based on the bet type. For example, as shown in FIG. 10, the group of pockets 1080 are contiguous, and the processor animates each pocket with an individual border-type highlight effect 1040 to indicate that each separate value is related to the first twelve numerical values available on the betting layout (as related to the First Twelve bet type). In contrast, as shown in FIG. 9A, the processor animates the border-type highlight effect 940 around an entire group of pockets that comprise the contiguous nature of the pockets on the roulette wheel that are related to the Grand Series bet type.

In some embodiments, the processor illustrates a highlight effect on a portion of the betting layout associated with the one or more bet-upon values. For example, as shown in FIG. 3, the processor animates highlight effects for one or more of the individual betting spots 324, 325, 326, or 327 with distinct colors to indicate the different call bet types. For instance, the betting spot 324 (which relates to the Zero Spiel bet type) is colored green, the betting spots 325 (which relates to the Grand Series bet type) is colored dark blue, the betting spot 326 (which relates to the Orphelins bet type) is colored light blue, and the betting spots 327 (which relates to the Tiers bet type) is colored purple.

Furthermore, the processor can combine highlight effects. For example, a portion of the highlight effect 341 can include a green color near the betting spot 324 and a dark blue color near the betting spot 325, a light blue color near the betting spot 327 and a purple color near the betting spot 327. The green and dark blue color appear on the right-hand side of the highlight effect 341 whereas the light blue and purple color appear on the left-hand side of the highlight effect 341. The highlight effect 342 is an additional highlight effect that appears when a bet is placed on one of the specific betting spots 324, 325, 326, or 327. For example, the token 331 is placed onto one of the betting spot 324 that is related to the Zero Spiel bet type. Consequently, in response the processor selects and animates the highlight effect 342 using the color green (which is the color associated with the Zero Spiel bet type). Furthermore, the processor can present (e.g., animate and/or illustrate) an additional type of highlight effect called a marker to indicate which of the individual layout values were bet upon for certain multi-value type bets. For example, the processor presents markers 333 that correspond to the bet-upon values for the Zero Spiel bet type. The markers 333 can also be used for other multi-value type bets, such as for the dozens bet type, the odd/even bet type, the red/black bet type, the column bet type, etc., which are available on the inner betting layout 320. Furthermore, the processor can color the markers according to the bet type. For example, because the token 331 is placed for the Zero Spiel bet type, the markers 333 which appear on the individual values for the Zero Spiel bet type are colored green (which is the color associated with the Zero Spiel bet type). The processor can select different colors for the marker-type highlight effects for different other types of multi-value bets (e.g., the Grand Series bet type, the Orphelins bet type, the Tiers bet type, etc.). If a plurality of multi-value bets are placed, then the processor can overlap markers on the overlapping individual values on which markers are placed. In the case of an overlap of bet-upon values, the processor can instead animate a single marker having multiple colors to highlight that the value is bet upon by the plurality of multi-value bets placed. For example, the processor positions the marker 334 (which is different from markers 333). The marker 334 is different in attributes from the marker 333 to indicates both a single-value bet type and a multi-value bet type were both placed on the value "3" (e.g., as a straight-up bet as a result of the placement of the toke 332 at betting spot 336, and as a multi-value bet as a result of the placement of the token 331 on the betting spot 324).

In addition to animating highlight effects on the roulette wheel and on the betting layout, the processor can animate highlight effects on other portions of a user interface or on other sections of a display associated with one or more gaming terminals. For instance, as shown in FIG. 3, a display 350 presents animated highlight effects on a graphical indication of statistics for the roulette game. In some embodiments, the display 350 is attached to the gaming terminal 101 or is separate from the gaming terminal, such as on virtual croupier display 1222 described in FIG. 12). In one embodiment the display 350 includes a user-input control (e.g., slider 360) which selects a range for a last number of spins of the roulette wheel to indicate via the statistics. The slider 360, for example, is set to show the statistics for the outcome values of the last fifty-seven (57) spins of the roulette wheel. Furthermore, the processor can select and animate the same highlight effect on the statistics per bet type as selected and animated on the roulette wheel or the betting layout. For example, the processor presents statistics 351 that relate to the different call bets for Orphelins, Tiers, and Grand Series. Statistics are not shown for the Zero Spiel bet type as the values for the Zero Spiel bet type are included in the statistics for the Grand Series bet type (as the Zero Spiel values are a subset of the values in the Grand Series bet type). The sections of the statistics that relate to each different bet type can be colored with the associated color for the bet type. Additional highlight effects (e.g., lines 357) are related to values that occurred as wins over the selected range of last spins for the different call type bets for Orphelins, Tiers, and Grand Series. The values 358 indicate which number values the ball landed in as a spin outcome. The processor colors each of the individual lines 357 according to the assigned colors for the bet types (e.g., one of the lines 357 related to the Grand Series bet type is colored dark blue, one of the lines 357 related to the Orphelins bet type is colored light blue, and one of the lines 357 related to the Tiers bet type is colored purple). Furthermore, the processor can present highlight effects 359 that indicate which of the past outcomes were associated with a multiplier (e.g., see FIG. 4 for more description of multipliers).

Referring momentarily back to FIG. 2, the flow 200 continues at processing block 214 where the processor determines whether a multiplier feature is activated. If the multiplier feature is not activated, then the flow 200 ends. If, however, the multiplier feature is activated, the flow continues at processing block 216, where the processor automatically selects at random a set of one or more individual values from the betting layout. The set of the randomly selected values for the multipliers may be referred to herein as the "multiplier value set." The flow 200 then continues at processing block 218 where the processor presents a multiplier-type highlight effect (also referred to as a "multiplier highlight effect") on the betting layout and/or on the roulette wheel for each member of the multiplier value set. In some embodiments, the number of values in the multiplier value set can be a fixed number of values or it can be a random number of values (e.g., the processor can always select a set amount of number values, such as four numbers from the betting layout, or the processor can select a random amount of number values).

Figure 4:
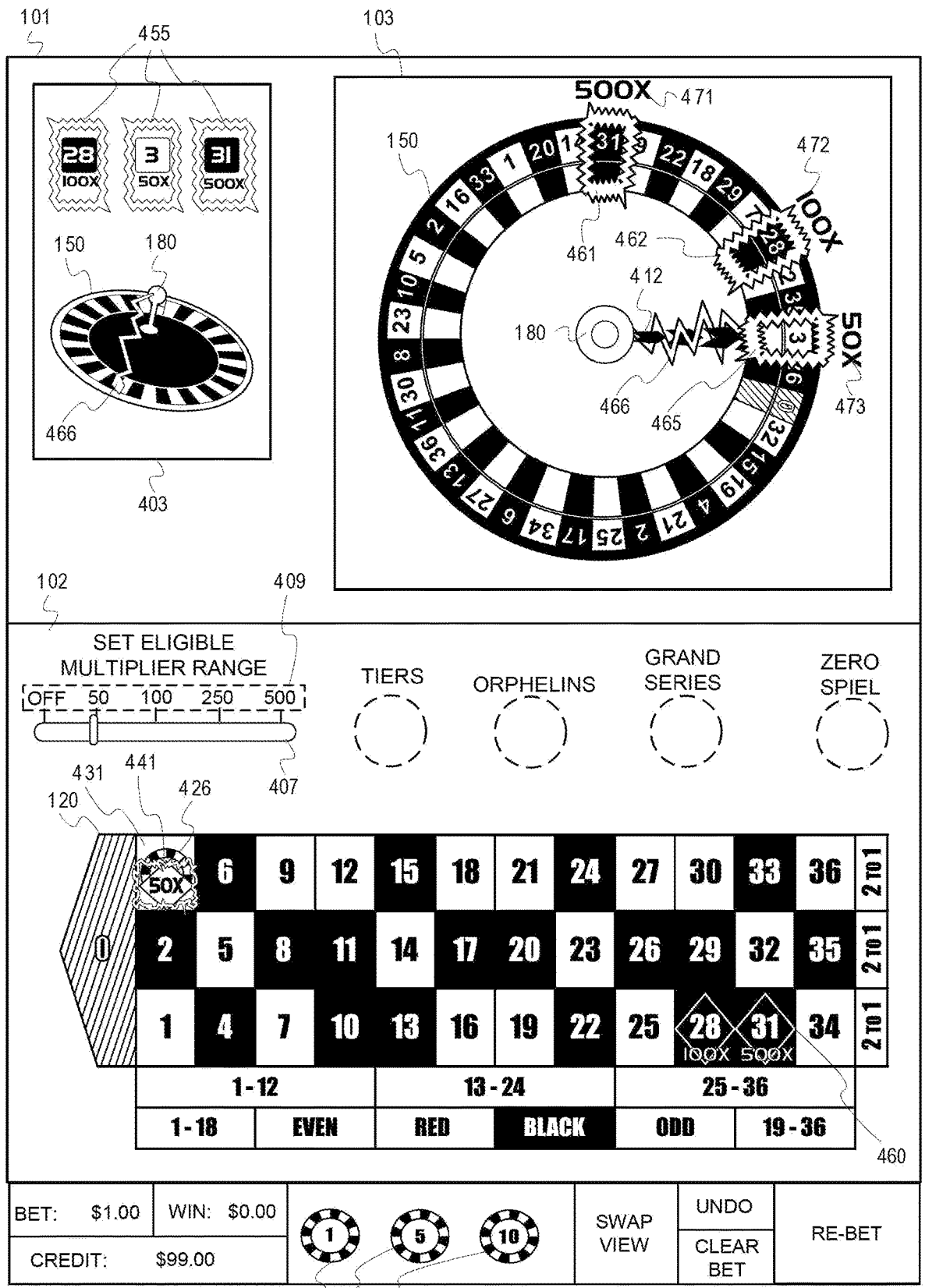
FIG. 4 is a diagram of concurrently controlling multiple types of roulette highlight features according to at least some aspects of the disclosed concepts.

In some embodiments, as shown in FIG. 4, the multiplier feature is activated via a user-interface object. In some embodiments, the user-interface object is accessible to an administrator via a game set-up, or configuration setting. In other embodiments, as illustrated in FIG. 4, the user-interface object (e.g., slider control 407) is accessible via the user interface 102. The slider control 407 includes a slider that can set an eligible multiplier range 409 to one of various levels (e.g., from zero or "off" to up to a "500×" multiplier). In some embodiments the eligible multiplier range 409 includes levels (i.e., ranges) of multipliers for which the player is eligible to win if a value in the multiplier value set coincides with a bet-upon value. In some embodiments, the selected setting for the eligible multiplier range 409 can affect payout odds for the game. In some embodiments, the eligible multiplier range 409 is related to a betting tier for the game. For instance, the selected setting for the eligible multiplier range 409 is related to a minimum required betting value for the roulette game (e.g., a lower multiplier eligibility setting equates to a lower minimum required betting amount, whereas a higher multiplier eligibility setting equates to a higher required minimum betting amount). In other embodiments, a betting tier is determined automatically in response to determining a minimum value of a denomination of the token being placed on the betting layout. For example, if a token having a lowest value (e.g., a token of value "1") is placed, then the processor can set the user-interface control (e.g., slider control 407) to a lowest positive-value setting of the eligible multiplier range 409 (e.g., the "50×" multiplier range). The processor then can select a multiplier highlight effect whose distinguishing characteristic (e.g., color) indicates the lowest range of eligible multiplier values. If, however, a token having a higher value (e.g., a token of value of "10") is placed first, then the processor can set slider control 407 to a higher value of the eligible multiplier range 409 (e.g., to the "100×," the "250×" or the "500×" multiplier range). The processor then can select a multiplier highlight effect whose distinguishing characteristic (e.g., color) indicates the selected range of eligible multiplier values.

In another embodiment, a betting tier is determined based on a selected eligible multiplier range 409. For example, the setting for the eligible multiplier range 409 can modify the denomination values for the available tokens 115. For instance, if the processor detects that the eligible multiplier range 409 is set to either "OFF" or to the next lowest eligibility setting (e.g., the "50×" multiplier range), then the denomination values for the available tokens 115 are set at a lowest range of denomination values (e.g., "1," "5," "10").

On the other hand, if the eligible multiplier range 409 is set to a next higher multiplier range (e.g., "100×"), then the processor automatically changes the range of denomination values to increase incrementally (e.g., the available tokens 115 change denomination values to "5," "10," and "15").

In some embodiments, the minimum betting amount and the range of denomination values for the available tokens 115 can both be modified in combination and/or interchangeably based on the eligible multiplier range 409. For instance, if the processor detects that the eligible multiplier range 409 is set to either "OFF" or if it is set to the lowest eligibility setting (e.g., the "50×" multiplier range), then the denomination values for the available tokens 115 are set at a lowest range of denomination values (e.g., "1," "5," "10") and the minimum betting amount is one betting unit (e.g., $1 or an equivalent number of credits that constitute a minimum betting unit). On the other hand, if the eligible multiplier range 409 is set to a next higher multiplier range (e.g., "100×"), then the processor leaves the denomination values for the available tokens 115 at their lowest range (e.g., "1," "5," "10") while increasing the minimum betting amount by one or more betting units (e.g., a $2, or equivalent credit amount, is now required). If the eligible multiplier range 409 is set to a next higher multiplier range (e.g., "250×") then, the processor automatically increases the minimum betting amount (e.g., to $5 or equivalent credit amount) and also changes the range of denomination values to increase reflect the change (e.g., the available tokens 115 change denomination values to a range of "5," "10," and "15"). In other embodiments, the lowest betting denomination value (e.g., $1 or equivalent credit value) is left available for selection and placement regardless of the betting tier.

FIG. 4 illustrates some examples of animating highlight effects for bets and for multipliers. For instance the processor detects that the range of eligible multiplier values 409 is set to the "50×" range. Thus, after the croupier has called an end to betting, the processor animates a first type of highlight effect (e.g., a lightning-type highlight effect 441) for the member values in randomly selected multiplier value set that fall within the selected one of the eligible multiplier ranges 409. For example, the processor randomly selected the values "3," "28," and "31" for the values of the multiplier value set. One of the multipliers (i.e., the "50×" multiplier) is randomly assigned to the betting spot 431 related to the value of "3." In one embodiment, because the range of eligible multiplier values 409 is set to the "50×" range, the processor determines that the player is eligible for the "50×" multiplier, but not for the "100×" and "500×" multipliers randomly assigned to the values of "28" and "31." Consequently, the processor highlights the betting spot 431 using the first type of highlight effect (i.e., the lightning-type highlight effect 441). Concurrently, the processor animates a second type of highlight effect (e.g., a diamond-type highlight effect 460) for the member values in the multiplier value set that fall outside the selected one of the eligible multiplier ranges 409. In other words, even if the player is not eligible for the "100×" or "500×" multipliers, the processor still animates the second type of highlight effect (i.e., the diamond-type highlight effect 460) at or around the betting spots for the "28" and "31" values respectively.

In some embodiments, some, or all, of the highlight effects for the different eligible multiplier ranges 409 can be animated using different colors. For example, the highlight effects related to the "50×" multipliers may utilize the color pink, the highlight effects related to the "100×" multipliers may utilize the color copper, the highlight effects related to the "250×" multiplier may utilize the color silver, and the highlight effects related to the "500×" multipliers may utilize the color gold. In other embodiments, only the highest range of multiplier is a different color from other multipliers (e.g., the "500×" multiplier effect is colored bright blue, whereas lower multiplier ranges are gold colored). In other words, the processor can cause an appearance of a multiplier effect to visually indicate a multiplier range and/or whether it is an eligible range based on the player inputs, settings, betting levels, selections, etc.

Still referring to FIG. 4, the processor animates, on the roulette wheel 150, the multiplier values at (e.g., on, around, or near) the pockets that relate to the values from the multiplier value set. For example, for the "500×" multiplier, the processor selects and animates the highlight effect 461 and highlight effect 471 at the pocket for the value "31." For the "100×" multiplier, the processor selects and animates the highlight effect 462 and highlight effect 472 at the pocket for the value "28." For the "50×" multiplier, the processor selects and animates the highlight effect 473 and highlight effect 465. In some embodiments, the processor animates an additional highlight effect (e.g., a dynamic, lightning-type highlight effect 466) to indicate that a multiplier value is currently being assigned to a number value. The multiplier highlight effects for the values of "31" and "28" were animated first in response to being selected first for the multiplier value set. The value of "3" is selected last, therefore as shown in FIG. 4, the processor animates the multiplier highlight effects for the value of "3" last (i.e., the processor presents the dynamic, lightning-type highlight effect 466 in association with the pocket associated with the value "3"). The processor had previously presented the dynamic, lightning-type highlight effect 466 when the values "28" and "31" were respectively selected. An additional display 403 indicates additional highlight effects 455 to demonstrate a list of the randomly selected values in the multiplier value set, as well as an additional representation of the roulette wheel 150 from a different perspective. The additional display 403 also shows the dynamic, lightning-type highlight effect 466 as it strikes a pocket (e.g., the pocket associated with the value "3"). In some embodiments, the processor removes the dynamic, lightning-type highlight effect 466 after a pocket becomes highlighted, thus leaving the border-type highlights (e.g., highlight effects 461, 462, and 465).

In some embodiments, the processor combines highlight effects based on specific conditions. For example, as shown in FIG. 4, the processor detects that a token 426 was positioned on the betting spot 431 associated with the value of "3" and hence animates the highlight effect 412. Further, the processor determines that a member from the multiplier value set (i.e., the value "3") coincides with the straight-up bet of the token 426 on betting spot 431. Because the value "3" corresponds to both the "50×" multiplier and the straight-up bet, the processor animates the highlight effect 412 in a way that combines (e.g., integrates) with the dynamic, lightning-type highlight effect 466. For instance, the dynamic, lightning-type highlight effect 466 appears to wrap around the highlight effect 412. In some embodiments, the highlight effect 412 appears to weave through the dynamic, lightning-type highlight effect 466.

Figure 5:
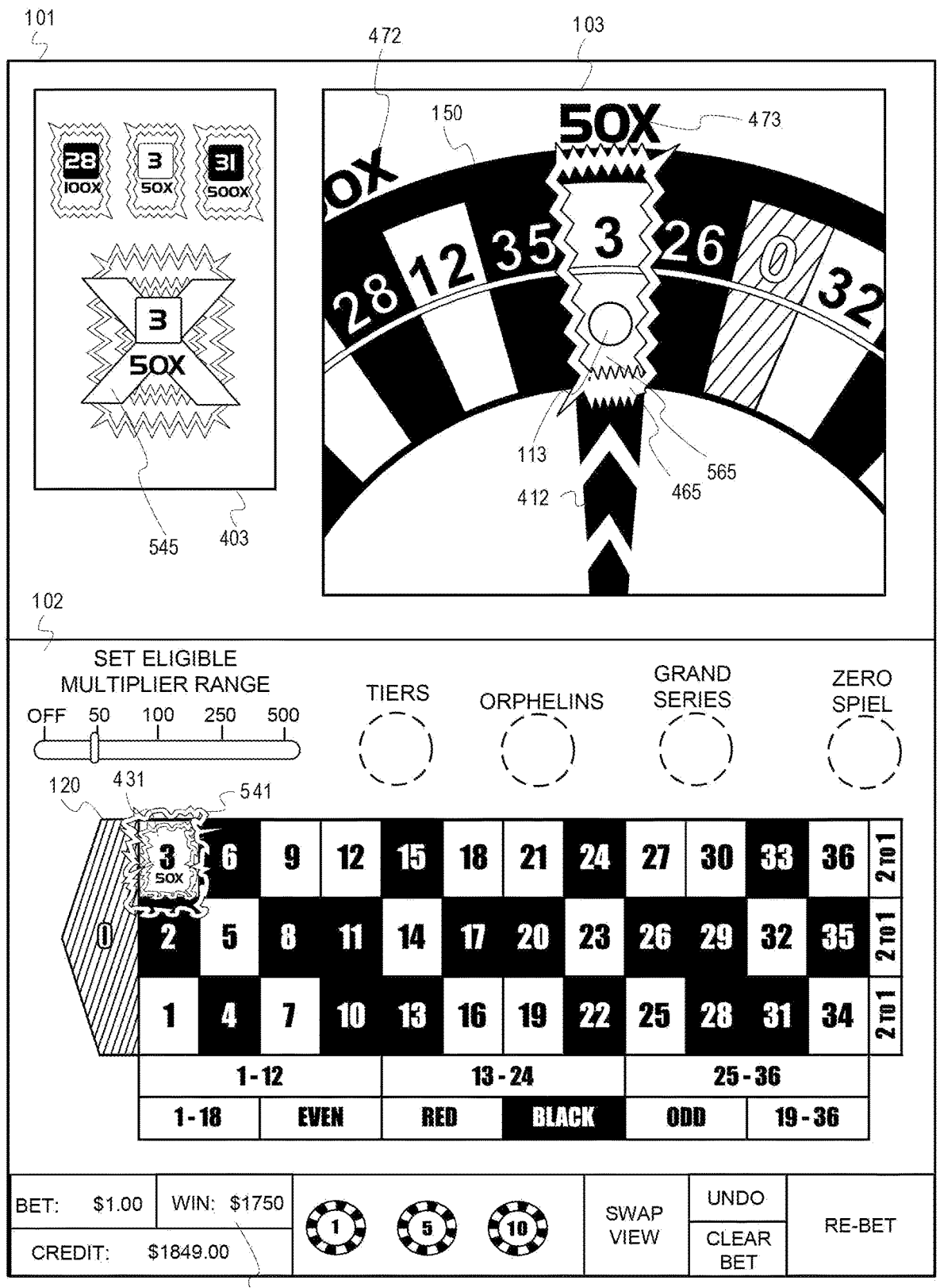
FIG. 5 is a diagram of concurrently controlling multiple types of roulette highlight features according to at least some aspects of the disclosed concepts.

FIG. 5 illustrates an example of the gaming terminal 101 after the roulette ball 113 has settled into a pocket 565 associated with value of "3" on the roulette wheel 150. The processor determines that the straight-up bet on the betting spot 431 and "50×" multiplier are both associated with the value of "3," hence the player has won fifty times the original payout for the straight-up bet (e.g., 50×36 to 1 payout=1750 credits as indicated in win meter 514). The display 103 continues to present the multiplier highlight effect 473 (which was in the eligible multiplier ranges 409) in relation to multiplier highlight effects for multipliers beyond the eligible range. For example, the processor continues to present the multiplier highlight effect 472 to demonstrate a proximity to higher ranges of multipliers, and to increase an interest in the player to select a higher value from the eligible multiplier ranges 409. In addition, because the straight-up bet paid off, the processor presents an additional highlight effect 541 around betting spot 431 and also presents an additional effect 545 (via the additional display 403) to emphasize the winning value of "3." The highlight effect 541 and the additional effect 545 can include the same distinguishing characteristic (e.g., the same color) as those for other highlight effects associated with the "50×" multiplier range.

In addition to embodiments already described, the following paragraphs describe additional possible embodiments.

As described, in some embodiments, the processor overlays graphical images of highlight effects onto a graphical depiction of a roulette wheel. In other embodiments, the processor animates the selected highlight effect as an augmented reality overlay onto a live video stream of a roulette wheel. In yet another embodiment, the processor animates the selected highlight effect as a projection of light that throws one or more images of the highlight effect onto the one or more portions of a physical roulette wheel (either from above the roulette wheel or from below the roulette wheel). In some embodiments, the processor utilizes a machine learning model to analyze a live video stream of the betting layout and detect, via image analysis, coordinates for pixels in the image that correspond to the position of the token in relation to coordinates for pixels in the image that relate to a betting layout. In some embodiments, the machine learning model uses object segmentation to detect coordinates of pixels for the betting layout as well as to detect coordinates of pixels for the roulette wheel. The machine learning model, is trained on images of a betting layout, images of tokens, images of placement of tokens on the betting layout, images of resting and spinning roulette wheel, etc. In response to the training, the machine learning model learns how to detect objects from images of the betting layout and determine, from the relative location of the objects within the video feed, positions of placement of tokens on a betting layout. The machine learning model can also determine locations on the physical roulette wheel on which to project images of the highlight effects. In one embodiment, the processor can cause a projector to project (e.g., throw) images of the highlight effects onto mapped locations for the parts of the roulette wheel, such as the borders of the pockets on the roulette wheel. For instance, the processor maps highlight effects to coordinates, or pixels, of the pockets and renders the highlight effects as graphical images on a virtual overlay of the live video stream and/or as a real-time 3D rendering. An exemplary system to detect physical gaming objects, such as tokens on a betting layout, is described in more detail in the patent application Ser. No. 16/943,128 (U.S. Publication No. 20210056804), titled SYSTEMS AND METHODS OF AUTOMATED LINKING OF PLAYERS AND GAMING TOKENS which is hereby incorporated by reference in its entirety. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

In some embodiments, the processor can instead, or in addition, illustrate an image of a wheel (e.g., camera feed or graphical rendering), on an additional display (e.g., on signage, on active headset viewers, etc.), on which graphical highlighting and/or augmented-reality (AR) highlighting can be superimposed over the image of the roulette wheel. In some embodiments, each player can have a viewer (e.g., glasses or other type of AR headset), that can show each player their individual bet selections by animating the highlight effects related to those bet selections via a virtual overlay for each individual viewer. The viewer overlay can show only the specific bets made by that player in relation to a viewing perspective of the player (via the viewer). In some embodiments, the viewer does not animate or highlight specific bets made by other players and/or does not animate highlight effects that relate to other players. The other players, however, can have their individually highlighted AR overlays (via their respective viewers) that only indicates their specific bets made. In some embodiments, the viewer can toggle views to show overlays of other players, and/or switch to a combined view that presents, on the AR overlay, all bets made by any or all players.

Figure 11:
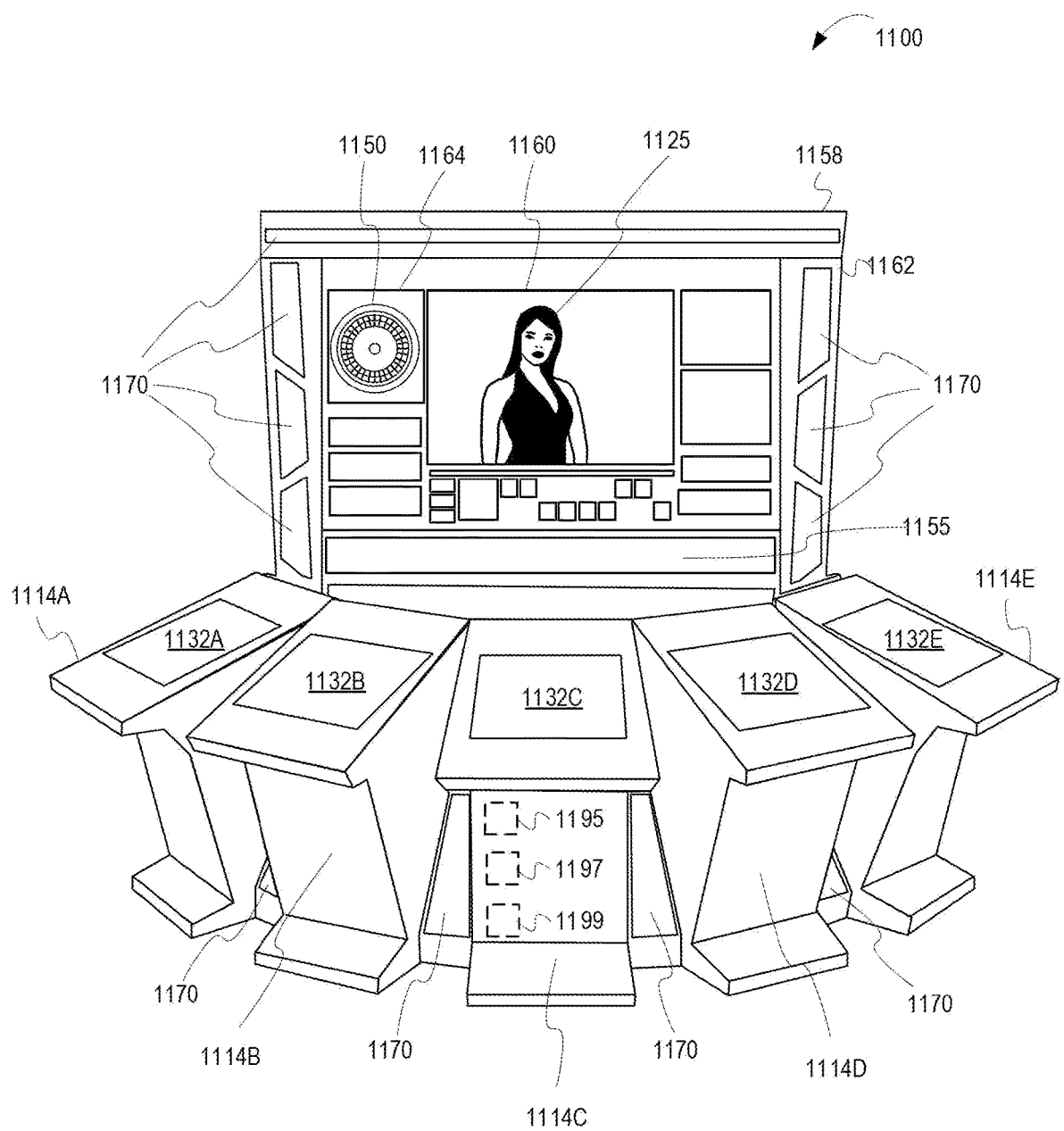
FIG. 11 is a perspective view of a gaming system 1100 configured for implementation with a virtual croupier according to at least some aspects of the disclosed concepts.

FIG. 11 is a perspective view of a gaming system 1100 configured for implementation with a virtual croupier 1125 according to at least some aspects of the disclosed concepts. In FIG. 11, the gaming system 1100 includes player terminals 1114A through 1114E that are arranged in a bank around a video device 1158. The video device 1158 includes a roulette wheel screen 1164 and a virtual croupier screen 1160. In some embodiments, the virtual croupier screen 1160 displays a video simulation of a croupier (e.g., virtual croupier 1125) for interaction with the video device 1158, such as through processing one or more stored programs stored in a memory 1195 to implement the rules of game play at the video device 1158. The virtual croupier screen 1160 may be carried by a generally vertically extending cabinet 1162 of the video device 1158. The roulette wheel screen 1164 may be configured to display at least a virtual roulette wheel 1150 that responds to operations for the virtual croupier 1125.

Each of the player terminals 1114A through 1114E includes a respective player interface area 1132A through 1132E that is configured for wagering and game play interactions with the video device 1158 and/or virtual croupier 1125. The player interface area 1132A through 1132E can present (depending on a display mode) either one of the user interface 102 or the display 103 described for FIG. 1. Furthermore, the display 103 can be presented via the video device 1158. Accordingly, game play may be accommodated without involving a physical roulette wheel, physical chips, and/or live personnel. The action may instead be simulated by a control processor 1197 interacting with and controlling the video device 1158. The control processor 1197 may be located internally within, or otherwise proximate to, the video device 1158, such as in one of the player terminals 1114A through 1114E. The control processor 1197 may be programmed to implement the rules of game play at the video device 1158. As such, in some embodiments, the control processor 1197 interacts and communicates with display/input interfaces and data entry inputs for each player interface area 1132A through 1132E of the respective player terminals 1114A through 1114E. Other embodiments of gaming systems and gaming devices may include a control processor that may be similarly adapted to the specific configuration of its associated device.

A communication device 1199 may be included and operably coupled to the control processor 1197 such that information related to operation of the gaming system 1100, information related to the game play, or combinations thereof may be communicated between the gaming system 1100 and other devices (not shown) through a suitable communication media, such, as, for example, wired networks, Wi-Fi networks, and cellular communication networks. In some embodiments, the communication device 1199 is, or is associated with, switch 1220 described for FIG. 12, the network 1330 described for FIG. 13, or the network adapter 1456 described for FIG. 14.

Referring still to FIG. 11, the video device 1158 may further include one or more banners 1155 configured to communicate rules of play and/or the like, which may be located along one or more walls 1170 of the cabinet 1162 or otherwise incorporated into the video device 1158. The video device 1158 may further include additional decorative lights (e.g., emotive lighting 1170) and speakers (not shown). In some embodiments, the processor animates highlight effects with the decorative lights. For instance, the processor can select a color for the decorative lights that matches (e.g., an attribute or characteristic of) a highlight effect.

Further detail of an example of a table and/or gaming system and player displays is disclosed in U.S. patent application Ser. No. 10/764,995, filed Jan. 26, 2004, published as U.S. Patent Application Publication No. 2005/0164762 on Jul. 28, 2005, now U.S. Pat. No. 8,272,958, issued Sep. 25, 2012, and titled "AUTOMATED MULTI-PLAYER GAME TABLE WITH UNIQUE IMAGE FEED OF DEALER," the disclosure of each of which application and patent is incorporated herein in its entirety by this reference. Although an embodiment is described showing individual discrete player stations, in some embodiments, the entire playing surface (e.g., player interface areas 1132A through 1132E, roulette wheel screen 1164, etc.) may be an electronic display that is logically partitioned to permit game play from a plurality of players for receiving inputs from, and displaying game information to, the players, the dealer, or both.

Figure 12:
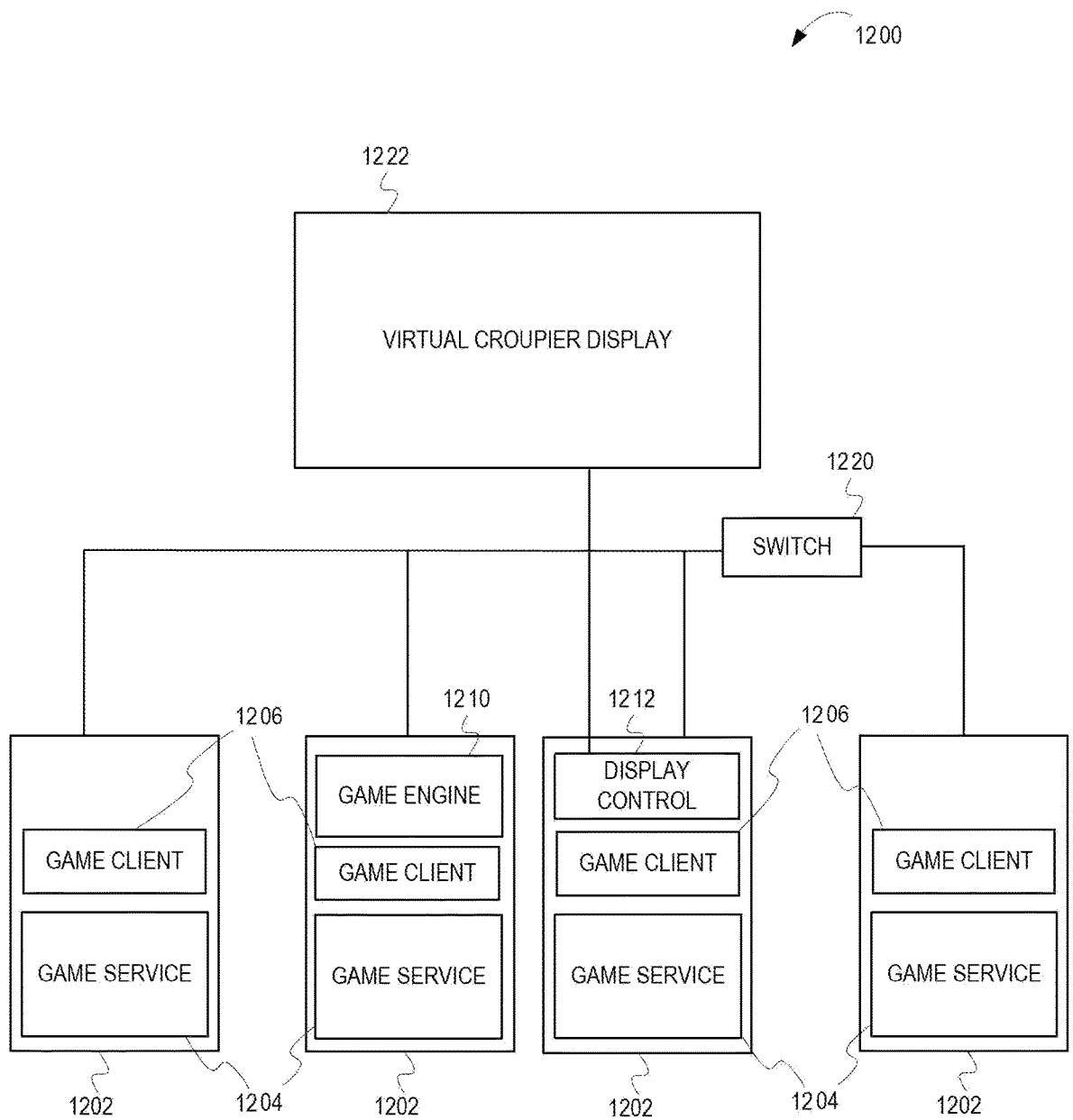
FIG. 12 is a schematic block diagram of a gaming system architecture 1200 according to at least some aspects of the disclosed concepts.

FIG. 12 is a schematic block diagram of a gaming system architecture ("architecture 1200") according to at least some aspects of the disclosed concepts. The architecture 1200 includes a plurality of player terminals 1202 communicatively coupled via a network communication device (e.g., switch 1220) to a virtual croupier display 1222. The virtual croupier display 1222 presents instructions from a virtual croupier for a group roulette game (e.g., as presented by video device 1158 described for FIG. 11). The virtual croupier display 1222 is controlled by a display control 1212 associated with one of the player terminals 1202. The display control 1212 is configured to present a (e.g., the display control 1212 animates the roulette wheel 1150 via the virtual croupier display 1222). Furthermore the game engine 1210 is associated with a different one of the player terminals 1202. The game engine 1210 executes roulette-outcome logic and contains a random number generator (RNG) to determine a final resting position for a roulette ball (e.g., roulette ball 113) and/or for randomly selecting multipliers.

Each of the player terminals 1202 includes a game client 1206 that subscribes to a game service 1204 associated with the roulette game. Each of the game clients 1206 is configured to present game content (e.g., game assets for betting layouts, roulette wheels, highlight effects, etc.). In some embodiments, the game clients 1206 are configured to present the game content and highlight effects via player interface areas 1132A through 1132E (shown in FIG. 11). In some embodiments, the game clients 1206 are configured to present the game content via user interface 102 (shown in FIG. 1 and in FIG. 3 through FIG. 5). Furthermore, in some embodiments, the game service 1204 is associated with the game server 1306 described for FIG. 13.

Figure 13:
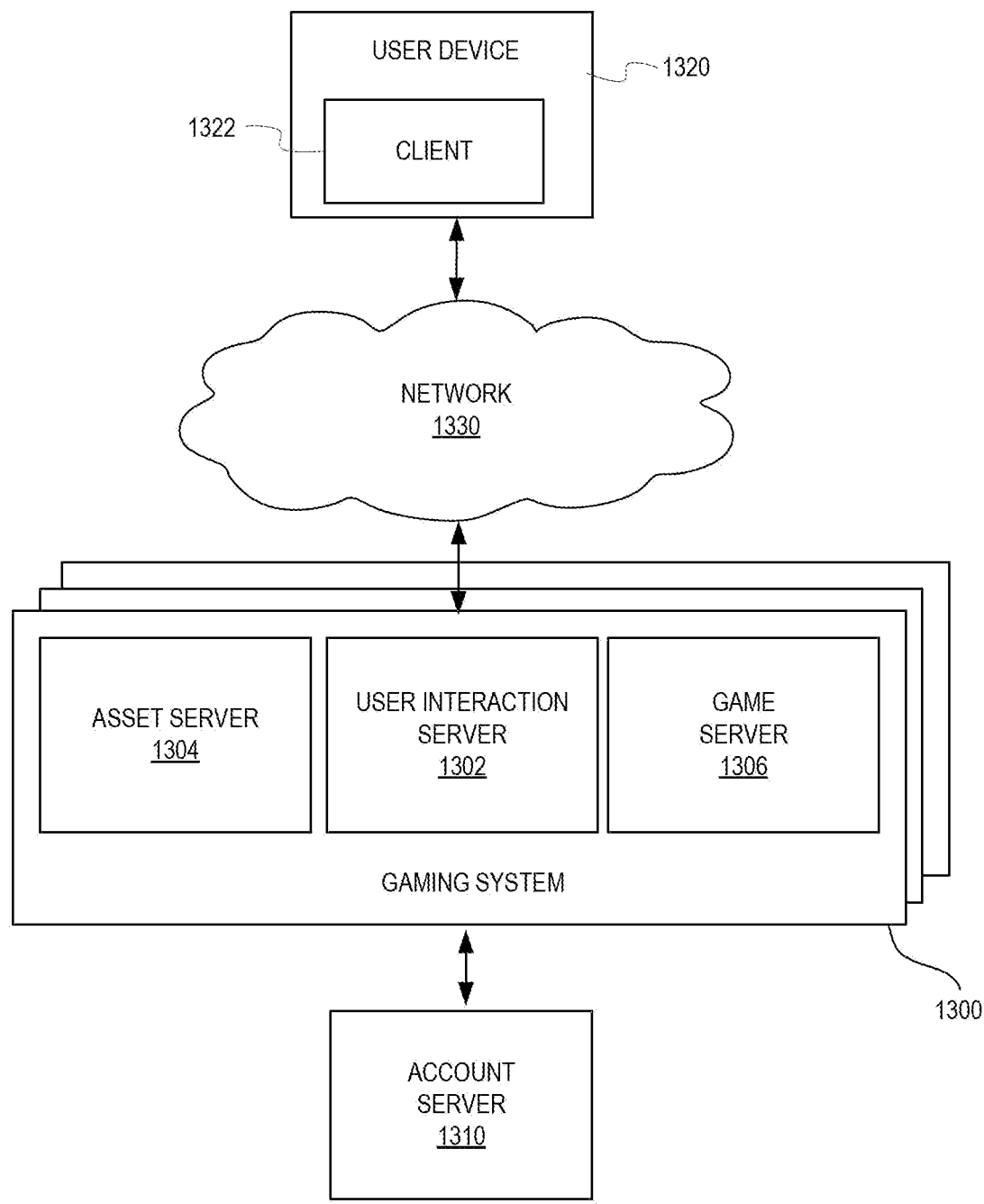
FIG. 13 is a schematic block diagram of a gaming system for implementing embodiments of waging games in accordance with at least some aspects of the disclosed concepts.

Referring to FIG. 13, illustrated is a schematic block diagram of a gaming system 1300 for implementing wagering games according to an embodiment of the present disclosure. The gaming system 1300 enables end users to access proprietary and/or non-proprietary game content through an online casino client 1322 ("the client 1322"). Such game content may include, without limitation, various types of wagering games such as card games, dice games, big wheel games, roulette, scratch off games ("scratchers"), and any other wagering game where the game outcome is determined, in whole or in part, by one or more random events.

The client 1322 may be an online casino that handles user funds, and enables play of a wide variety of casino-style games, such as roulette, card games, dice games, slot games, and electronic gaming machine (EGM) games. A player accesses the client 1322 with a user device 1320 such as a personal computer, tablet, cell phone or other mobile device over a network, such as the internet or a closed casino network. Players are able to make real money wagers through the user device 1320 and the client 1322 delivers game results to the player over a network (not shown). Losses are taken by the online casino, and wins are paid out to the player. The client 1322 handles client funds, and interacts with financial service providers to transfer funds in and out of the casino accounts. The server architecture of the client 1322 can take many forms. In one example, the client 1322 is operably connected to a separate remote gaming system 1300 that administers and delivers game results for one or more games, but in other embodiments, all of the online game play is administered in the client 1322. Exemplary gaming systems 1300 deliver game results, administer game rules, and confirm wagers are made and that funds are available, but such systems do not interact directly with users and do not handle player funds.

The wagering games supported by the gaming system 1300 may track player account balances and may use this information to confirm a game result can be delivered. The same system could be used to administer play-for-fun games in which account balances are tracked but do not represent real currency.

A virtual credits option may be used with wagering games in which credits (or other symbols) may be issued to a player to be used for the wagers. A player may be credited with credits in any way allowed, including, but not limited to, a player purchasing credits; being awarded credits as part of a contest or a win event in this or another game (including non-wagering games); being awarded credits as a reward for use of a product, casino, or other enterprise, time played in one session, or games played; or may be as simple as being awarded virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This may attract players to the site and to the games before they engage in wagering. In some embodiments, a limited number of free or promotional credits may be issued to entice players to play the games. Another method of issuing credits includes issuing free credits in exchange for identifying friends who may want to play. In another embodiment, additional credits may be issued after a period of time has elapsed to encourage the player to resume playing the game. The gaming system 1300 may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 1300 may include a gaming platform that establishes a portal for an end user to access via a user device 1320 to a wagering game hosted by a game server 1306 through a user interaction server 1302. The user device 1320 may communicate with user interaction server 1302 using a network 1330 (e.g., the Internet). The user interaction server 1302 may communicate with the game server 1306 and provide game information, such as graphical displays and game interactions to the user. In some embodiments, the functionality of the gaming system 1300 may be incorporated into the online casino client 1322. In some embodiments, a single user device 1320 communicates with a game provided by the game server 1306, while other embodiments may include a plurality of user devices 1320 configured to communicate and provide end users with access to the same game provided by the game server 1306. In addition, a plurality of end users may be permitted to access a single user interaction server 1302, or a plurality of user interaction servers 1302, to access the game server 1306.

The user interaction server 1302 may communicate with the user device 1320 through the client 1322 to enable access to the gaming system 1300. The user may be unaware that the game is being administered by gaming system 1300 and not the client 1322. In embodiments, the user device 1320 includes a user display that includes game assets delivered from the asset server 1304 from gaming system 1300, as well as casino assets (such as the casino name, logo and other distinctive graphics) delivered by the client 1322. The user interaction server 1302 may enable a user to create and access a user account and interact with gaming server 1306. The user interaction server 1302 may enable users to initiate new games, join existing games, and interface with games being played by the user.

In some embodiments, the user interaction server 1302 may also provide the client 1322 for execution on the user device 1320 for accessing the gaming system 1300. The client 1322 provided by the gaming system 1300 for execution on the user device 1320 can comprise a variety of implementations according to the user device 1320 and method of communication with the gaming system 1300. In one embodiment, the user device 1320 connects to the gaming system 1300 using a web browser, and the client 1322 executes within a browser window or frame of the web browser. In another embodiment, the client 1322 is a stand-alone executable on the user device 1320.

In one embodiment, the client 1322 may comprise a relatively small amount of script (e.g., JAVASCRIPT®), also referred to as a "script driver," including scripting language that controls an interface of the client 1322. The script driver may include simple function calls requesting information from the gaming system 1300. In other words, the script driver stored in the client 1322 may merely include calls to functions that are externally defined by, and executed by, the gaming system 1300. As a result, the client 1322 may be characterized as a "thin client." As that term is used herein, the client 1322 may be little more than a script player. The client 1322 may simply send requests to the gaming system 1300 rather than performing logic itself for the games administered by gaming system 1300. The client 1322 may perform logic for other games that are not administered by gaming system 1300. For example, gaming system 1300 may administer an online casino's card games while all other games are administered by the client 1322. The client 1322 receives player inputs, and the player inputs are passed to the gaming system 1300 for processing and executing the wagering game. In one embodiment, this includes providing specific graphical display information to the client 1322 as well as game outcomes.

In other embodiments, the client 1322 comprises an executable file rather than a script. In that case, the client 1322 may do more local processing than does a script driver, such as calculating where to show what game symbols upon receiving a game outcome from game server 1306 through user interaction server 1302. In one embodiment, it may be that portions of an asset server 1304 are loaded onto the client 1322 and are used by the client 1322 in processing and updating graphical displays. Due to security and integrity concerns, some embodiments will have the bulk of the processing of the game play performed in the gaming system 1300. However, some embodiments may include significant game processing by the client 1322 when the client and user device 1320 are considered trustworthy or when there is reduced concern for security and integrity in the displayed game outcome. In most embodiments, it is expected that some form of data protection, such as end-to-end encryption, will be used when data is transported over network 1330. Network 1330 may be any network, including, but not limited to, the Internet, a communications network, a cell-phone network, a mobile device network, a wireless network, etc.

In an embodiment where the client 1322 implements further logic and game control methodology beyond the thin client, the client 1322 may parse and define player interactions prior to passing the player interactions to the gaming system 1300. Likewise, when the client 1322 receives a gaming interaction from the gaming system 1300, the client 1322 may be configured to determine how to modify the display as a result of the gaming interaction. The client 1322 may also allow the player to change a perspective or otherwise interact with elements of the display that do not change aspects of the game.

The gaming system 1300 may include an asset server 1304, which may host various media assets (e.g., audio, video, and image files) that may be sent to the client 1322 for presenting the various wagering games to the end user. In other words, in this embodiment, the assets presented to the end user may be stored separately from the client 1322. In one embodiment, the client 1322 requests the assets appropriate for the game played by the user; in other embodiments, especially those using thin clients, just those assets that are needed for a particular display event will be sent by game server 1306 when the game server 1306 determines they are needed, including as few as one asset. In one example, the client 1322 may call a function defined at the user interaction server 1302 or asset server 1304, which may determine which assets are to be delivered to the client 1322 as well as how the assets are to be presented by the client 1322 to the end user. Different assets may correspond to the various clients that may have access to the game server 1306 or to different games to be played.

The game server 1306 is configured to perform game play methods and determine game play outcomes that are provided to the user interaction server 1302 to be transmitted to the user device 1320 for display on the end user's computer. For example, the game server 1306 may include game rules for one or more wagering games, such that the game server 1306 controls some or all of the game flow for a selected wagering game as well as the determined game outcomes. The game server 1306 may include pay tables and other game logic. The game server 1306 also performs random number generation for determining random game elements of the wagering game. In one embodiment, the game server 1306 is separated from the user interaction server 1302 by a firewall or other method of preventing unauthorized access to the game server 1306 from the general members of the network 1330.

The user device 1320 may present a gaming interface to the player and communicate the user interaction to the gaming system 1300. The user device 1320 may be any electronic system capable of displaying gaming information, receiving user input, and communicating the user input to the gaming system 1300. As such, the user device 1320 can be a desktop computer, a laptop, a tablet computer, a set-top box, a mobile device (including, but not limited to, a smartphone), a kiosk, a terminal, or another computing device. The user device 1320 operating the client 1322 may comprise an interactive electronic gaming system, such the gaming terminal 101 (see FIG. 1) or the gaming system 1100 (see FIG. 11). The client 1322 may be a specialized application or may be executed within a generalized application capable of interpreting instructions from an interactive gaming system, such as a web browser.

The client 1322 may interface with an end user through a web page or an application that runs on a device including, but not limited to, a smartphone, a tablet, or a general computer, or the client 1322 may be any other computer program configurable to access the gaming system 1300. The client 1322 may be illustrated within a casino webpage (or other interface) indicating that the client 1322 is embedded into a webpage, which is supported by a web browser executing on the user device 1320.

In one embodiment, the gaming system 1300 may be operated by a different entity than the operator of the client 1322. The hardware of gaming system 1300 may be located remotely from the client 1322. The user device 1320 may be operated by a third party, such as a casino or an individual, that links to the gaming system 1300, which may be operated, for example, by a wagering game service provider. Therefore, in some embodiments, the user device 1320 and the client 1322 may be operated by a different administrator than the operator of the game server 1306, and the user device 1320 and the client 1322 may also be operated by separate administrators. In other words, the user device 1320 may be part of a third-party system that does not administer or otherwise control the gaming system 1300 or game server 1306.

In another embodiment, the user interaction server 1302 and asset server 1304 are provided by a third-party system. For example, a gaming entity (e.g., a casino) may operate the user interaction server 1302 or user device 1320 to provide its customers access to game content managed by a different entity that may control game server 1306, amongst other functionality. In some embodiments, these functions are operated by the same administrator. For example, a gaming entity (e.g., a casino) may elect to perform each of these functions in-house, such as providing both the access to the user device 1320 and the actual game content and providing administration of the gaming system 1300.

The gaming system 1300 may communicate with one or more external account servers 1310, optionally through another firewall. For example, the gaming system 1300 itself may not directly accept wagers or issue payouts. That is, the gaming system 1300 may facilitate online casino gaming but may not be part of a self-contained online casino itself. Instead, the gaming system 1300 may facilitate the play of wagering games owned and controlled by a company offering games and gaming products and services, such as SHFL entertainment, Inc. Another entity (e.g., a casino or any account holder or financial system of record) may operate and maintain its external account servers 1310 to accept bets and make payout distributions. The gaming system 1300 may communicate with the account servers 1310 to verify the existence of funds for wagering and to instruct the account server 1310 to execute debits and credits.

In some embodiments, the gaming system 1300 may directly accept bets and make payout distributions, such as in the case where an administrator of the gaming system 1300 operates as the client 1322. As discussed above, the gaming system 1300 may be integrated within the operations of a casino rather than separating out functionality (e.g., game content, game play, credits, debits, etc.) among different entities. In addition, for play-for-fun wagering games, the gaming system 1300 may issue credits, take bets, and manage the balance of the credits according to the game outcomes, but the gaming system 1300 may not permit payout distributions or be linked to an account server 1310 that permits payout distributions. Such credits may be issued for free, through purchase, or for other reasons, without the ability for the player to cash out. Such play-for-fun wagering games may be administered on platforms that do not permit traditional gambling, such as to comply with jurisdictions that do not permit online gambling. In embodiments where a user device 1320 accesses games administered by gaming system 1300 through the client 1322, the account server 1310 contains "mirror accounts" that track account balances to confirm wagers have been made and there are funds to support the wagers before delivering game results. In this embodiment, no actual player funds are handled by the account server 1310.

The gaming system 1300 may be configured in many ways, from a fully integrated single system to a distributed server architecture. The asset server 1304, the user interaction server 1302, the game server 1306, and the account server 1310 may be configured as a single, integrated system of code modules running on a single server or machine, where each of the servers is functionally implemented on a single machine. In such a case, the functionality described herein may not be implemented as separate code modules. The asset server 1304, the user interaction server 1302, the game server 1306, and the account server 1310 may also be implemented as a plurality of independent servers, each using its own code modules running on a separate physical machine, and may further include one or more firewalls between selected servers (depending on security needs). Each server could communicate over some kind of networked connection, potentially as varied as that described for network 1330. Further, each single server shown in FIG. 13 may be implemented as a plurality of servers with load balancing and scalability factors built into the embodiment. All such embodiments and variations are fully contemplated.

Additional features may be supported by the game server 1306, such as hacking and cheating detection, data storage and archival, metrics generation, messages generation, output formatting for different end user devices, as well as other features and operations. For example, the gaming system 1300 may include additional features and configurations as described in U.S. patent application Ser. No. 13/353,194, filed Jan. 18, 2012, and application Ser. No. 13/609,031, filed Sep. 10, 2012, both titled "NETWORK GAMING ARCHITECTURE, GAMING SYSTEMS, AND RELATED METHODS," the disclosures of which are incorporated herein in their entirety by this reference.

The network 1330 may enable communications between the user device 1320 and the gaming system 1300, and the user device 1320 and the online casino client 1322. A network may also connect the gaming system 1300 and account server 1310, and, further, one or more networks may interconnect one or more of the other servers shown collectively as the game system 1300. In one embodiment, the network 1330 uses standard communications technologies and/or protocols. Thus, the network 1330 can include links using technologies such as Ethernet, 802.11, worldwide interoperability for microwave access (WIMAX®), 3G, digital subscriber line (DSL), asynchronous transfer mode (ATM), INFINIBAND®, PCI Express Advanced Switching, etc. Similarly, the networking protocols used on the network 1330 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1330 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 1330 can include links comprising one or more networks such as the Internet.

Figure 14:
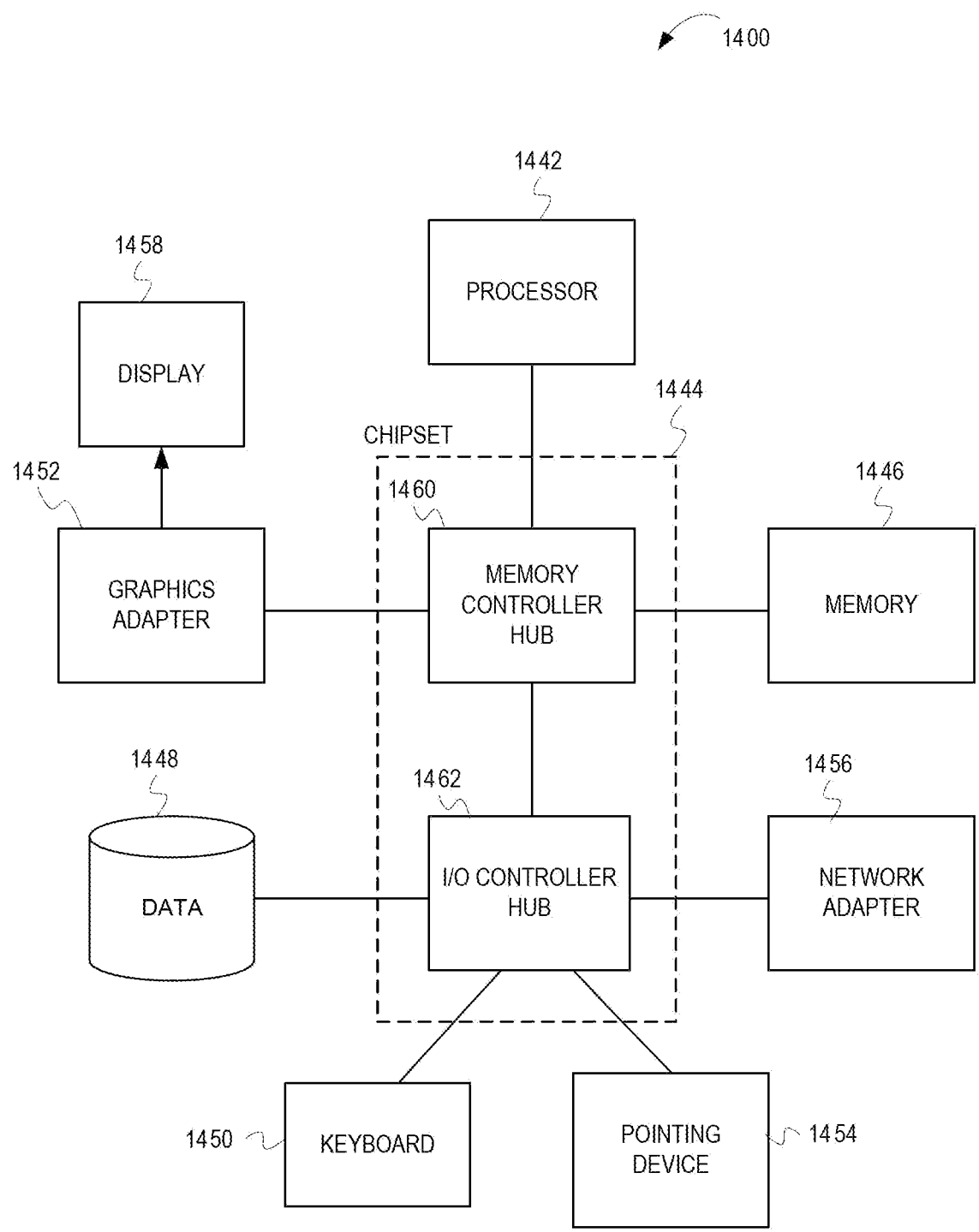
FIG. 14 is a block diagram of a computer for acting as a gaming system for implementing embodiments of wagering games according to at least some aspects of the disclosed concepts.

Turning now to FIG. 14, there is shown a block diagram of a high-level block diagram of a computer system 1400 according to one or more embodiments. In one embodiment, the computer system 1400 can be used for acting as the gaming system 1300 (see FIG. 13). The computer system 1400 includes at least one processor 1442 coupled to a chipset 1444, as indicated in dashed lines. Also coupled to the chipset 1444 are memory 1446, a storage device 1448, a keyboard 1450, a graphics adapter 1452, a pointing device 1454, and a network adapter 1456. A display 1458 is coupled to the graphics adapter 1452. In one embodiment, the functionality of the chipset 1444 is provided by a memory controller hub 1460 and an I/O controller hub 1462. In another embodiment, the memory 1446 is coupled directly to the processor 1442 instead of to the chipset 1444.

The storage device 1448 is any non-transitory computer-readable storage medium, such as a hard drive, a compact disc read-only memory (CD-ROM), a DVD, or a solid-state memory device (e.g., a flash drive). The memory 1446 holds instructions and data used by the processor 1442. The pointing device 1454 may be a mouse, a track pad, a track ball, or another type of pointing device, and it is used in combination with the keyboard 1450 to input data into the computer system 1400. The graphics adapter 1452 displays images and other information on the display 1458. The network adapter 1456 couples the computer system 1400 to a local or wide area network.

As is known in the art, the computer system 1400 can have different and/or other components than those shown in FIG. 14. In addition, the computer system 1400 can lack certain illustrated components. In one embodiment, the computer system 1400 acting as the gaming system 1300 (FIG. 13) lacks the keyboard 1450, pointing device 1454, graphics adapter 1452, and/or display 1458. Moreover, the storage device 1448 can be local and/or remote from the computer system 1400 (such as embodied within a storage area network (SAN)). Moreover, other input devices, such as, for example, touch screens may be included.

The network adapter 1456 (may also be referred to herein as a communication device) may include one or more devices for communicating using one or more of the communication media and protocols discussed above with respect to FIG. 13.

In addition, some or all of the components of this general computer system 1400 of FIG. 14 may be used as part of the processor and memory discussed above with respect to the systems or devices described for FIG. 1, FIG. 3, FIG. 4, FIG. 5, FIG. 11, FIG. 12, or FIG. 13.

The gaming system 1300 (FIG. 13) may comprise several such computer systems 1400. The gaming system 1300 may include load balancers, firewalls, and various other components for assisting the gaming system 1300 to provide services to a variety of user devices.

The computer system 1400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1448, loaded into the memory 1446, and executed by the processor 1442.

Figure 15:
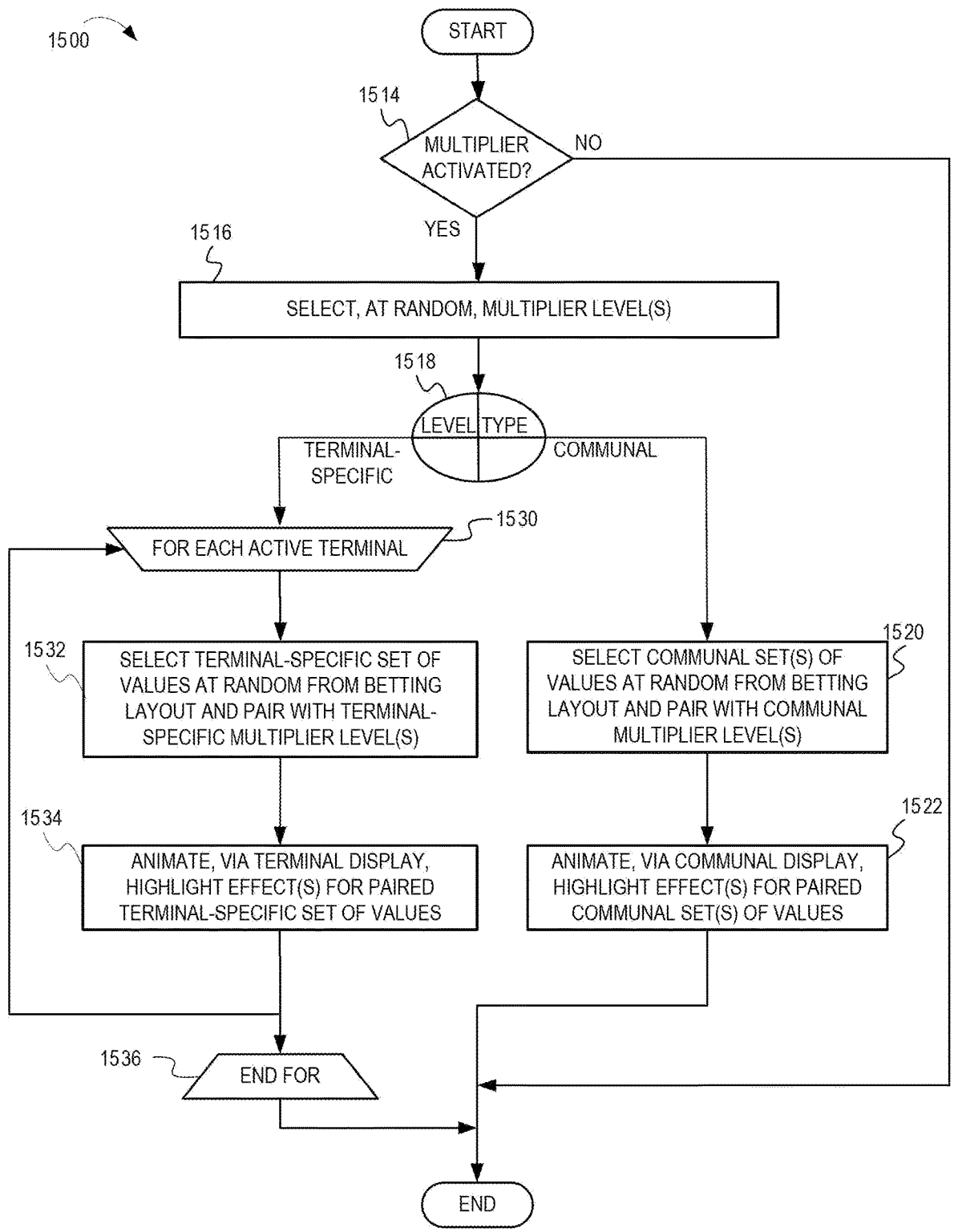
FIG. 15 is a flowchart for controlling roulette highlight features according to at least some aspects of the disclosed concepts.
Figure 16:
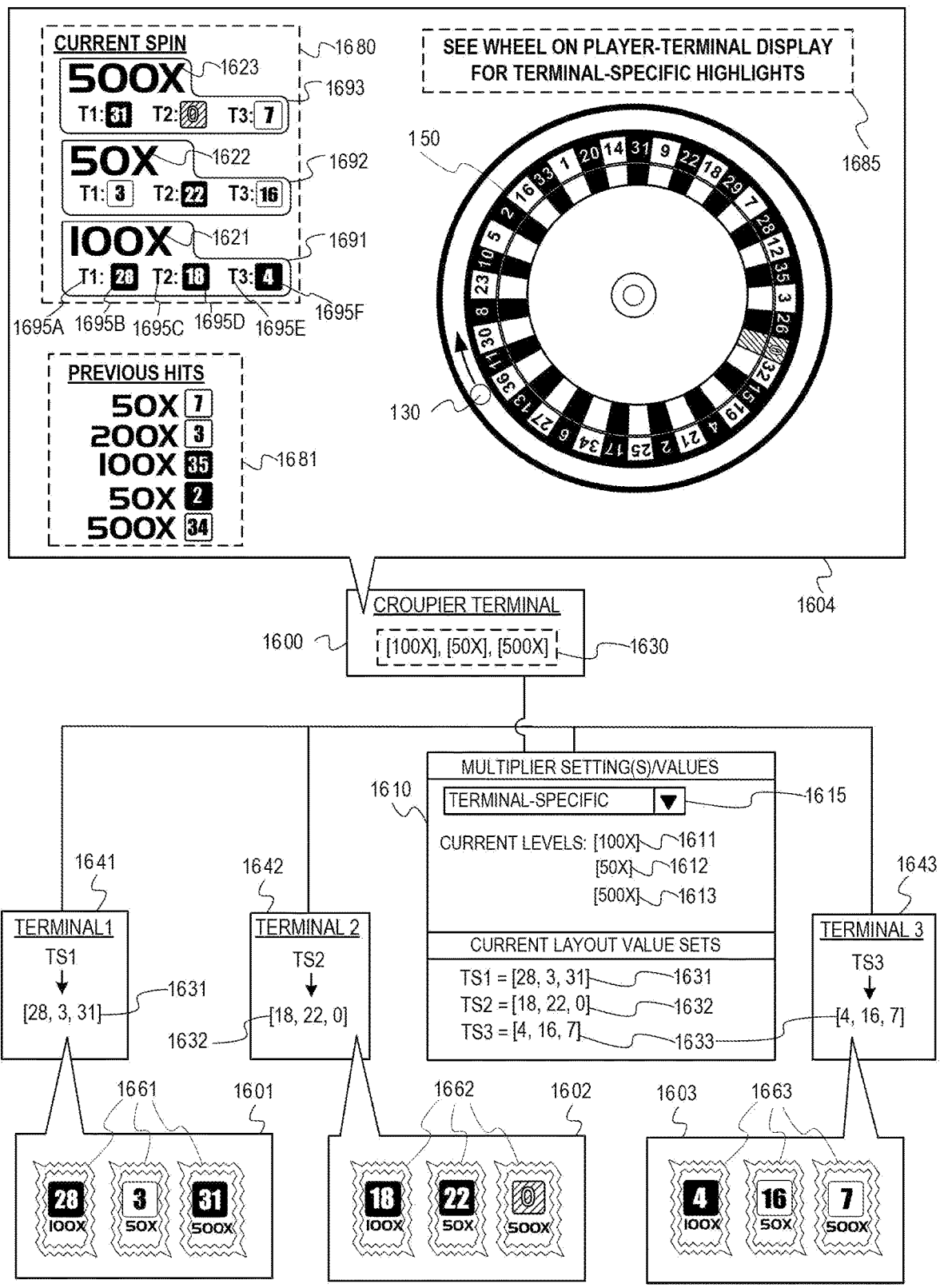
FIG. 16 and FIG. 17 are diagrams of game features illustrating aspects of the embodiment in FIG. 15 according to at least some aspects of the disclosed concepts.
Figure 17:
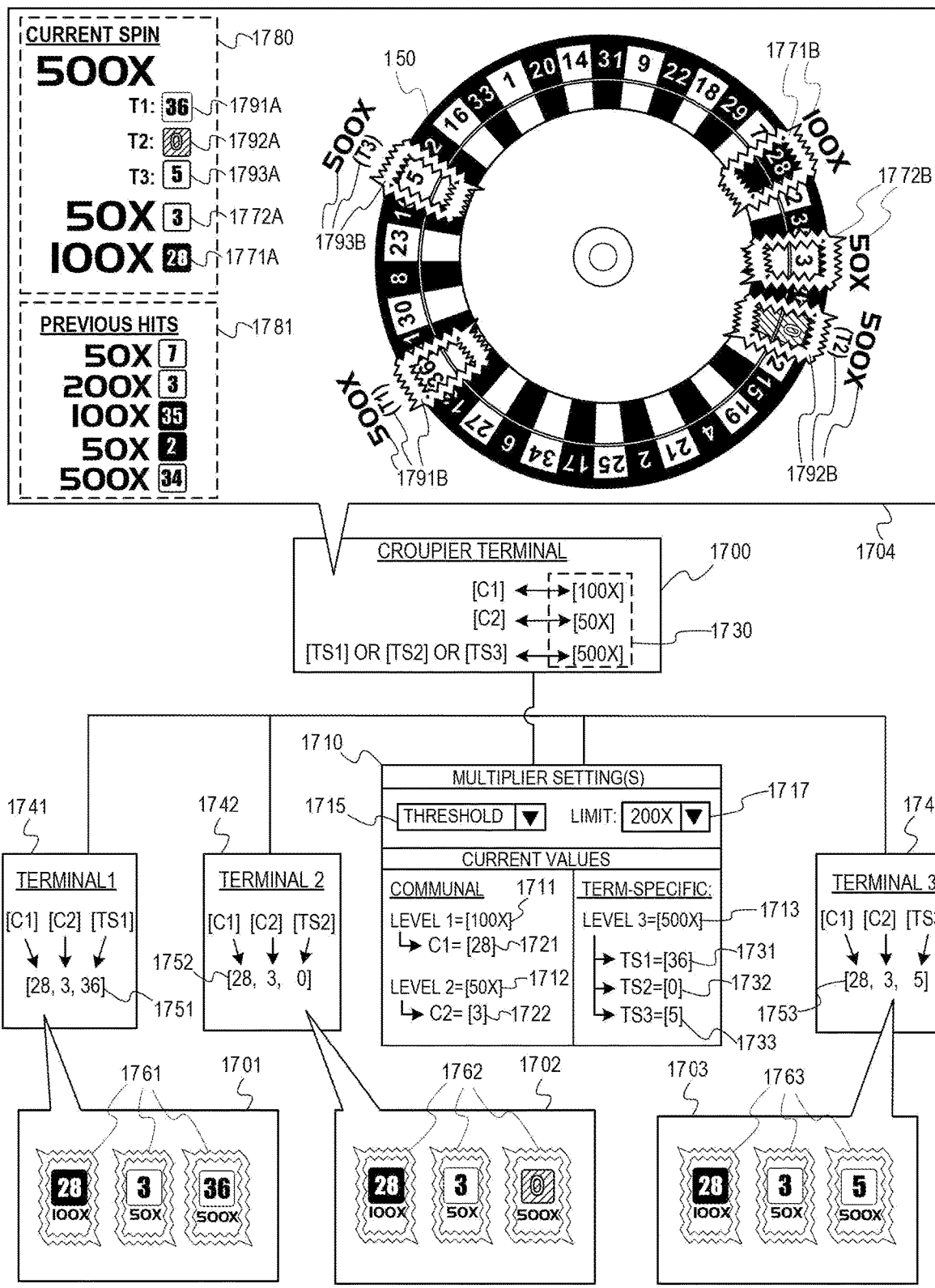

FIG. 15 is a flowchart for controlling roulette highlight features according to some aspects of the disclosed concepts. FIG. 16 and FIG. 17 are diagrams of roulette highlight features according to at least some aspects of the disclosed concepts. FIG. 16 and FIG. 17 will be referred to in association with the description of the flow 1500 of FIG. 15.

FIG. 15, FIG. 16, and FIG. 17 illustrate some examples of a gaming system (e.g., a gaming terminal) that uses different types of multiplier levels, such as "terminal-specific" multiplier levels, "communal" multiplier levels, or some combination thereof. Multipliers levels may also be referred to herein as multiplier ranges (e.g., see eligible multiplier ranges 409). In one embodiment, the gaming system can apply the same multiplier levels (and the same randomly selected layout values) to each of the player terminals equivalently, or communally. For instance, as illustrated in FIG. 4, a gaming system randomly selects the multiplier levels "100×," "50×," and "500×" and assigns to (e.g., pairs with) those selected multiplier levels the randomly selected betting-layout values of "28," "3," and "31" respectively (i.e., the "100×" level is paired with the layout value "28,"

the "50×" level is paired with the layout value "3," and the "500×" level is paired with the layout value "31"). Furthermore, as mentioned in FIG. 11 or FIG. 12, a gaming system may include multiplier gaming terminals associated with different players (e.g., in FIG. 11 the gaming system 1100 includes player terminals 1114A through 1114E, and in FIG. 12 the architecture 1200 includes a plurality of player terminals 1202). The gaming system uses the first paired level (i.e., the "100×" level paired with the layout value "28"), the second paired level (i.e., the "50×" level paired with the layout value "3"), and the third paired level (i.e., the "500×" level paired with the layout value "31") as the possible winning values/levels for all player terminals for the current spin. Thus each player terminal is eligible for the same selected current values. However, if the gaming system were to pair a large multiplier level (e.g., the "500×" level) with the same layout value (e.g., the value "31"), and if each player had bet on the value of "31" (e.g., either as a single-value bet type or as part of a multi-value bet type), and further if the roulette ball falls into the pocket for the value of "31," then the gaming system would be obligated to apply the "500×" multiplier for all of the player terminals at the same time, resulting in a payout that could be beyond a margin of risk for a given game operator. Therefore, in another embodiment, the gaming system can be configured to select and use different paired multiplier levels and layout values for the different player terminals, such as to limit the potential multiplier payouts (and hence reduce the potential payout risk). FIG. 15 illustrates a flow 1500 that illustrates an example method to use multiplier levels that are either "terminal-specific," "communal," or some combination thereof. FIG. 16 illustrates an example of where all selected multiplier levels are a terminal-specific type. FIG. 17 illustrates an example of where the multiplier levels are a mixture of a terminal-specific type and communal types.

Referring to FIG. 15, the flow 1500 begins at processing block 1514 where a processor (e.g., of a gaming terminal, a gaming system, a gaming server, etc.) determines whether a multiplier feature is activated. In some embodiments, the flow 1500 may include additional processing blocks that occur before processing block 1514. For example, in one embodiment, the processing block 1514 flows from processing block 212 of FIG. 2. For instance, the flow 1500 can be an alternative embodiment to the flow elements 214, 216, and 218 of flow 200. Referring still to FIG. 15, at processing block 1514, if the multiplier feature is not activated, then the flow 1500 ends. If, however, the multiplier feature is activated, the flow 1500 continues at processing block 1516, where the processor automatically selects, at random, a set (e.g., one or more) multiplier levels. In some embodiments, the set of multiplier levels can have a fixed number of levels or it can be a random number of levels for each spin of the roulette wheel (e.g., the processor can always select a fixed number of multiplier levels per spin, such as three levels, or the processor can select a random number of multiplier levels per spin). For example, in the FIG. 16, the processor randomly selects a set of three multiplier levels: a first level 1611 (e.g., having a value of "100×"), a second level 1612 (e.g., having a value of "50×"), and a third level 1613 (e.g., having a value of "500×"). The processor can randomly select the multiplier levels from a pool or range of possible multiplier levels, such as the multiplier levels associated with the eligible multiplier ranges 409 (see FIG. 4). The selected multiplier levels shown in FIG. 16 may be referred to collectively as the current multiplier set 1630, or in other words, the set of multiplier levels selected to be assigned to random values from the betting layout for a current spin.

Furthermore, as illustrated in FIG. 16, several player terminals (i.e., a first terminal 1641, a second terminal 1642, and a third terminal 1643) are networked with a game controller 1610 and a croupier terminal 1600. The game controller 1610 can include a random number generator used to randomly select multiplier levels (e.g., a "50×" multiplier level, a "100×" multiplier level, a "200×" multiplier level, a "250×" multiplier, a "500×" multiplier level, etc.). In the example in FIG. 16, after bets are closed for a given spin, the game controller 1610 randomly selects the first level 1611 (i.e., the "100×" multiplier level), the second level 1612 (i.e., the "50×" multiplier level) and the third level 1613 (i.e., the "500×" multiplier level).

In one embodiment, the game controller 1610 randomly selects the multipliers levels and transmits data about the multiplier levels to the terminals (e.g., to terminal 1600, 1641, 1642, and 1643). In other words, in one embodiment, one game controller randomly selects the same set of multiplier levels for communal use by all terminals. However, in another embodiment, a separate game controller (e.g., processor, client, etc.) associated with each terminal can randomly select a specific set of multiplier levels for use only at that terminal. For instance, each player terminal can randomly select a unique set of multipliers for use at only that specific player terminal. The player terminal can also randomly select terminal-specific sets of values from the betting layout and pair them with the set of multipliers selected by the player terminal (e.g., as at processing block 1532). In one embodiment, the croupier terminal can also randomly select a set of multipliers and can also randomly select a set of values from the betting layout to pair with the set of multipliers. The set of multipliers selected by the croupier terminal can be communal-type multiplier levels for which any of the active player terminals are eligible.

Referring back to FIG. 15, the flow 1500 continues at processing block 1518 where a processor determines the level types that were selected. In some embodiments, the level types may be "terminal-specific" or they may be "communal." Multiplier level types that are terminal-specific are level types that will be assigned to a unique set of random values for each different player terminal at a roulette table. Level types that are communal include level types that will be assigned to a set of random values that are common for all player terminals. FIG. 16, for example, illustrates an example of where all level types are terminal-specific (i.e. the entire set of multiplier levels are assigned to different sets of unique values (selected from the betting layout) for each of the player terminals). In one embodiment, the game controller 1610 detects a value for a configuration setting or control (e.g., setting 1615). For example, the game controller 1610 detects that the setting 1615 is set to a value of "TERMINAL-SPECIFIC" meaning that the game controller 1610 will select distinct sets of layout values for each of the player terminals 1641, 1642, and 1643, and the game controller 1610 will pair those distinct sets to the randomly selected multiplier levels.

Referring momentarily back to FIG. 15, the flow 1500 continues at processing block 1530 where a processor initiates a loop (e.g., a "for" loop) where the loop repeats for each active terminal. An active terminal is a player terminal from which a bet was placed for a current game-play round (or "spin") of the roulette wheel 150. For example, as shown In FIG. 16, the game controller 1610 determines that the first terminal 1641, the second terminal 1642, and the third terminal 1643 have all placed bets on a betting layout for the roulette game, and therefore, are all eligible for the multiplier feature of the roulette game.

Referring again to FIG. 15, the flow 1500 continues at processing block 1532 where, in response to detecting that a terminal-specific type of multiplier level is used, the processor selects a terminal-specific set of values at random from the betting layout and pairs the terminal-specific set of values with the terminal-specific multiplier level(s). For example, in FIG. 16, in one embodiment the game controller 1610 selects (via a RNG of the game controller 1610) three unique sets of layout values, namely a first set 1631, a second set 1632, and a third set 1633. Each of the unique sets of layout values has a number of members that is equivalent to a number of randomly selected multiplier levels. For instance, three multiplier levels were selected (i.e., the first level 1611, the second level 1612, and the third level 1613). Thus, the game controller 1610 selects three separate layout values for each of the first set 1631, the second set 1632, and the third set 1633.

For instance, the game controller 1610 randomly selects, as values for first set 1631, the layout values "28," "3," and "31." The game controller 1610 assigns (e.g., transmits, passes, etc.) the first set 1631 to the first terminal 1641. The game controller 1610 further pairs (e.g., associates) the individual members of the first set 1631 with the respective individual members of the current multiplier set 1630. For instance, the first layout value "28" (from the first set 1631) is paired with the first level 1611 (i.e., "28" is paired with "100×"); the second layout value "3" (from the first set 1631) is paired with the second level 1612 (i.e., "3" is paired with "50×"); and the third layout value "31" (from the first set 1631) is paired with the third level 1613 (i.e., "31" is paired with "500×").

Additionally, the game controller 1610 randomly selects, as values for second set 1632 the layout values "18," "22," and "0." The game controller 1610 assigns (e.g., transmits, passes, etc.) the second set 1632 to the second terminal 1642. The game controller 1610 further pairs the individual members of the second set 1632 with the respective individual members of the current multiplier set 1630. For instance, the first layout value "18" (from the second set 1632) is paired with the first level 1611 (i.e., "18" is paired with "100×"); the second layout value "22" (from the second set 1632) is paired with the second level 1612 (i.e., "22" is paired with "50×"); and the third layout value "0" (from the second set 1632) is paired with the third level 1613 (i.e., "0" is paired with "500×").

Furthermore, the game controller 1610 randomly selects, as values for third set 1633 the layout values "4," "16," and "7." The game controller 1610 assigns (e.g., transmits, passes, etc.) the third set 1633 to the third terminal 1643. The game controller 1610 further pairs the individual members of the third set 1633 with the respective individual members of the current multiplier set 1630. For instance, the first layout value "4" (from the third set 1633) is paired with the first level 1611 (i.e., "4" is paired with "100×"); the second layout value "16" (from the third set 1633) is paired with the second level 1612 (i.e., "16" is paired with "50×"); and the third layout value "7" (from the third set 1633) is paired with the third level 1613 (i.e., "7" is paired with "500×").

In one embodiment the game controller 1610 can randomly select the multiplier levels (e.g., via a RNG of the game controller 1610) and can also randomly select the sets 1631, 1632, and 1633 (e.g., via the same RNG) and assign the sets 1631, 1632 and 1633 with the current multiplier set 1630. In other embodiments, each terminal 1641, 1642, and 1643 can have its own separate RNG that can randomly select its own set of terminal-specific layout values. For example, the game controller 1610 can use a first RNG to randomly select the multiplier levels. The first terminal 1641 can use a second RNG (stored within the first terminal 1641 or accessible via a network) to generate the first set 1631. The second terminal 1642 can use a third RNG (stored within the second terminal 1642 or accessible via the network) to generate the second set 1632. The third terminal 1643 can use a fourth RNG (stored within the third terminal 1643 or accessible via the network) to generate the third set 1633. Each individual terminal 1641, 1642, and 1643 can further receive, from the game controller 1610, the current multiplier set 1630 and can pair its terminal-specific set of layout values with the current multiplier set. Furthermore, the game controller 1610 can transmit the current multiplier set 1630 to the croupier terminal 1600 and/or to the player terminals 1641, 1642, and 1643. Likewise, the game controller 1610 (and/or the individual player terminals 1641, 1642, and 1643) can transmit to the croupier terminal 1600 the sets 1631, 1632, and 1633.

Returning momentarily to FIG. 15, the flow 1500 continues at processing block 1534 where the processor animates, via a terminal display, highlight effect(s) for the terminal-specific set of values. For example, in FIG. 16, the first terminal 1641 presents (e.g., via a first terminal display 1601) highlight effects 1661. The highlight effects 1661, for instance, illustrate a relationship between paired values, such as a first graphic that visually associates the paired values "28" and "100×," a second graphic that visually associates the paired values "3" and "50×," and a third graphic that visually associates the paired values "31" and "500×." Likewise, the second terminal 1642 presents (via a second terminal display 1602) highlight effects 1662. The highlight effects 1662, for instance, illustrate a relationship between paired values, such as a first graphic that associates the paired values "18" and "100×," a second graphic that associates the paired values "22" and "50×," and a third graphic that associates the paired values "0" and "500×." Further, the third terminal 1643 presents (via a third terminal display 1603) highlight effects 1663. The highlight effects 1663, for instance, illustrate a relationship between paired values, such as first graphic that associates the paired values "4" and "100×," a second graphic that associates the paired values "16" and "50×," and a third graphic that associates the paired values "7" and "500×."

Each of the terminal displays 1601, 1602, and 1603 can present the highlight effects as stand-alone graphics (as shown for the highlight effects 1661, 1662, or 1663), as graphics superimposed over an image of the betting layout, as graphics superimposed over an image of the roulette wheel, a combination thereof, etc. For instance the terminal display 1601 can present an image of the wheel 150 with terminal-specific highlight effects superimposed over at least a portion of the pockets for the values "28," "3," and "31." The display 1601 can also present an image of the betting layout (not shown) with terminal-specific highlight effects superimposed over betting spots associated with the values "28," "3," and "31." Concurrently, the terminal display 1602 can present a separate image of the wheel 150 with terminal-specific highlight effects superimposed over at least a portion of the pockets for the values "18," "22," and "0." Further, the terminal display 1602 can present a separate image of the betting layout with terminal-specific highlight effects superimposed over betting spots associated with the values "18," "22," and "0." Likewise, the terminal display 1603 can present a separate image of the wheel 150 with terminal-specific highlight effects superimposed over at least a portion of the pockets for the values "4," "16," and "7." Further, the terminal display 1603 can present a separate image of the betting layout with terminal-specific highlight effects superimposed over betting spots associated with the values "4," "16," and "7." The croupier terminal 1600 can also be configured to present information and/or highlight effects related to the terminal-specific and/or communal values. For example, the croupier terminal 1600 presents a display 1604 that includes an image of the roulette wheel 150 and a section 1680 that presents information related to a current spin or game play round for the roulette game, such as information about one or more types of multiplier levels (e.g., terminal-specific or communal) and/or randomly selected layout values that correspond to the a paired levels. For example, the section 1680 presents a first-level subsection 1691 that includes a highlight effect 1621 that specifies the value ("100×") for the first level 1611 as well as additional highlight effects (1695A, 1695B, 1695C, 1695D and 1695E) that visually associate the active terminals with current terminal-specific layout values paired with the first level 1611. For example, in the first-level subsection 1691, a first graphic 1695A indicates a label (i.e., "T1:") which signifies the first terminal 1641. A second graphic 1695B indicates the terminal-specific layout value of "28." The second graphic 1695B is associated visually with the first graphic 1695A (e.g., the label "T1:" is positioned to the immediate left of the value "28"), thus specifying (e.g., visually associating) the paired relationship between the first level 1611 ("100×"), the first terminal 1641 ("T1:"), and the randomly selected, terminal-specific layout value of "28."

Additionally, within the first-level subsection 1691, a third graphic 1695C (e.g., with a label "T2:" which signifies the second terminal 1642) is associated visually with a fourth graphic 1695C (e.g., the value "18"), thus visually indicating the paired relationship between the first level 1611 (e.g., "100×"), the second terminal 1642 (e.g., "T2:"), and the randomly selected, terminal-specific layout value of "18." Similarly, within the first-level subsection 1691, a fifth graphic 1695E (e.g., with a label "T3:" which signifies the third terminal 1643) is associated visually with a sixth graphic 1695F (e.g., the value "4"), thus visually indicating the paired relationship between the first level 1611 (e.g., "100×"), the third terminal 1643 (e.g., "T3:"), and the randomly selected, terminal-specific layout value of "4."

Additionally, a second-level subsection 1692 includes highlighting effects that visually indicate the paired relationships between the second level 1612 (e.g., "50×") and the terminal-specific layout values of "3," "22," and "16" (which are visually associated with additional instances of the graphics that signify the first terminal 1641 (e.g., "T1:"), the second terminal 1642 (e.g., "T2:"), and the third terminal 1643 (e.g., "T3:") respectively).

Furthermore, a third-level subsection 1693 includes highlighting effects that visually indicate the paired relationship between the third level 1613 (i.e., the "500×") and the terminal-specific layout values of "31," "0," and "7" (which are visually associated with additional instances of the graphics that signify the first terminal 1641 (e.g., "T1:"), the second terminal 1642 (e.g., "T2:"), and the third terminal 1643 (e.g., "T3:") respectively).

The display 1604 also presents section 1681, which indicates a history of when a randomly selected layout value wins during a spin of the roulette wheel 150. For example, during any previous spins, if the ball 130 lands in a pocket associated with a betting layout value that was randomly selected and paired with a multiplier level, then the winning value, and its paired multiplier level, are listed in the section 1681. The section 1681 shows results from the last five times a winning layout value coincided with a multiplier level. However, in other embodiments, the section 1681 can show more, or fewer, than the last five times. Furthermore, a player terminal display (e.g., display 1601, 1602, or 1603) can show a history that is terminal-specific. For instance, the terminal display 1601 can show a history of winning values specifically related to the first terminal 1641 or specifically related with a player account logged into the first terminal 1641; terminal display 1602 can show a history for the second terminal 1642 or for a player account logged into the second terminal 1642; etc.

Furthermore, the croupier display 1604 may be a common display (e.g., viewable from all player terminals). Thus, the wheel 150 on the display 1604 may or may not show highlight effects related to communal values and/or terminal-specific values. In the example shown in FIG. 16, because all randomly selected layout values are terminal-specific (e.g., because of the setting 1615), then the wheel 150 shown on the common display (e.g., display 1604) does not include highlight effects. Instead, the display 1604 shows a message 1685 that indicates that each player terminal display (e.g., displays 1601, 1602, and 1603) will present an image of the wheel 150 having the randomly selected, terminal-specific layout values that pertain only to the specific terminal (e.g., see display 101 illustrated in FIG. 4).

Referring again to FIG. 15, after the loop 1530 repeats for all of the active terminals the flow continues at processing block 1536 where the loop ends. Furthermore, as mentioned, at processing block 1518, some multiplier levels can be considered communal. For example, in some embodiments, a configuration setting (e.g., setting 1615) may be set to indicate that at least some multiplier levels are communal. For instance the configuration setting may be set to "ALL COMMUNAL" meaning that all randomly selected multiplier levels will only be paired with randomly selected layout values that apply commonly to all player terminals. In another example, the configuration setting may be set to a value that indicates a mixture of terminal-specific levels and communal levels (e.g., see FIG. 17). If there are any communal levels, the flow 1500 branches from processing block 1518 and continues to processing blocks 1520 and 1522. Thus, the flow 1500 can include two concurrently running branches: one for terminal-specific levels (i.e., constituting the processing blocks 1530, 1532, 1534, and 1536) and a second for communal levels (i.e., constituting the processing blocks 1520 and 1522). At processing block 1520, a processor selects a communal set of values at random from the betting layout and pairs the communal set of values with the communal multiplier levels. At processing block 1522, the processor animates, via a communal display, highlight effects for the paired communal set of values.

FIG. 17 illustrates an example of both terminal-specific and communal levels. In FIG. 17 a game controller 1710 randomly selects a set of three multiplier levels: a first level 1711 (e.g., having a value of "100×"), a second level 1712 (e.g., having a value of "50×"), and a third level 1713 (e.g., having a value of "500×"). The selected multiplier levels may be referred to collectively as the current multiplier set 1730, or in other words, the set of multiplier levels selected, for the current spin, to be paired with random values from the betting layout. The game controller 1710 selects two of the multiplier levels, namely the first level 1711 and the second level 1712, as communal levels for the current spin. The game controller 1710 also selects one of the multiplier levels, namely the third level 1713, as a terminal-specific level for the current spin. For instance, the game controller 1710 detects that a value of a configuration setting (e.g., setting 1715) permits at least some communal levels. One such setting value (e.g., "THRESHOLD") indicates an example where if the game controller 1710 randomly selects a multiplier level whose value meets or exceeds a given multiplier value threshold (e.g., the multiplier level exceeds a value of "200×"), then the game controller 1710 will make that multiplier level terminal-specific. Conversely, if the game controller 1710 randomly selects a multiplier level whose value is under the threshold (e.g., the multiplier level is less than or equal to "200×"), then the game controller 1710 will make that multiplier level communal. For example, the game controller 1710 randomly selects the first level 1711 and determines that its value (i.e., "100×") does not exceed the threshold (e.g., does not exceed the threshold value of "200×" specified by the setting 1717). Therefore, the game controller 1710 specifies the first level 1711 as communal. In response to specifying the first level 1711 as communal, the game controller 1710 randomly selects from the betting layout a first layout value 1721 (e.g., the value "28") and pairs the first layout value 1721 with the first level 1711. Additionally, the game controller 1710 randomly selects the second level 1712 and determines that its value (i.e., "50×") also does not exceed the threshold (e.g., does not exceed the threshold value of "200×" specified by the setting 1717). Therefore, the game controller 1710 also specifies the second level 1712 as communal. In response to specifying the second level 1712 as communal, the game controller 1710 randomly selects from the betting layout a second layout value 1722 (e.g., the value "3") and pairs the second layout value 1722 with the second level 1712. Furthermore, the game controller 1710 randomly selects a third level 1713 and determines that its value (i.e., "500×") meets or exceeds the threshold (e.g., exceeds the threshold value of "200×" specified by the setting 1717). Therefore, the game controller 1710 specifies the third level 1713 as terminal-specific. In response to specifying the third level 1713 as terminal-specific, the game controller 1710 randomly selects from the betting layout three terminal-specific layout values 1731, 1732, and 1733 (one value for each of the active terminals 1741, 1742, and 1743). The game controller 1710 pairs the first terminal-specific layout value 1731 (i.e., the value "36") with the third level 1713 and associates the pairing with the first terminal 1741. The game controller 1710 pairs the second terminal-specific layout value 1732 (i.e., the value "0") with the third level 1713 and associates the pairing with the second terminal 1742. The game controller 1710 pairs the third terminal-specific layout value 1733 (i.e., the value "5") with the third level 1713 and associates the pairing with the third terminal 1743.

The first terminal 1741 presents highlight effects 1761 that specify the paired communal values as well as the terminal-specific pairing for the first terminal 1741. For instance, the first terminal 1741 presents (via display 1701) a first highlight effect that indicates the pairing of the first level 1711 (i.e., "100×") with the first communal value 1721 (i.e., "28"). The first terminal 1741 also presents (via display 1701) a second highlight effect that indicates the pairing of the second level 1712 (i.e., "50×") with the second communal value 1721 (i.e., "3"). The first terminal 1741 also presents (via display 1701) a third highlight effect that indicates the pairing of the third level 1713 (i.e., "500×") with the first terminal-specific value 1731 (i.e., "36").

The second terminal 1742 presents highlight effects 1762 that specify the paired communal values as well as the terminal-specific pairing for the second terminal 1742. For instance, the second terminal 1742 presents (via display 1702) a first highlight effect that indicates the pairing of the first level 1711 (i.e., "100×") with the first communal value 1721 (i.e., "28"). The second terminal 1742 also presents (via display 1702) a second highlight effect that indicates the pairing of the second level 1712 (i.e., "50×") with the second communal value 1721 (i.e., "3"). The second terminal 1742 also presents (via display 1702) a third highlight effect that indicates the pairing of the third level 1713 (i.e., "500×") with the second terminal-specific value 1732 (i.e., "0").

The third terminal 1743 presents highlight effects 1763 that specify the paired communal values as well as the terminal-specific pairing for the third terminal 1743. For instance, the third terminal 1743 presents (via display 1703) a first highlight effect that indicates the pairing of the first level 1711 (i.e., "100×") with the first communal value 1721 (i.e., "28"). The third terminal 1743 also presents (via display 1703) a second highlight effect that indicates the pairing of the second level 1712 (i.e., "50×") with the second communal value 1721 (i.e., "3"). The third terminal 1743 also presents (via display 1703) a third highlight effect that indicates the pairing of the third level 1713 (i.e., "500×") with the third terminal-specific value 1733 (i.e., "5").

A croupier terminal 1700 presents, via a common display 1704, highlight effects that specify the paired communal values as well as the paired terminal-specific values. For instance, the croupier terminal 1700 presents (via display 1704) a section 1780 indicating highlight effects 1771A, 1172A, 1791A, 1792A, and 1793A. Highlight effect 1771A specifies the pairing of the first level 1711 (i.e., "100×") with the first communal value 1721 (i.e., "28"). Highlight effect 1772A specifies the pairing of the second level 1712 (i.e., "50×") with the second communal value 1721 (i.e., "3"). Highlight effect 1791A specifies the pairing of the third level 1713 (i.e., "500×") with the first terminal-specific value 1731 (i.e., "36"). Highlight effect 1792A specifies the pairing of the third level 1713 (i.e., "500×") with the second terminal-specific value 1732 (i.e., "0"). Highlight effect 1793A specifies the pairing of the third level 1713 (i.e., "500×") with the third terminal-specific value 1733 (i.e., "5").

The croupier terminal 1700 can further present highlight effects on an image of the wheel 150 presented via the display 1704. For example, prior to (and during) the spinning of the wheel 150, the display 1704 presents highlight effect 1771B, which specifies the pairing of the first level 1711 and the first communal value 1721. For instance, the highlight effect 1771B is superimposed over at least a portion of the pocket associated with the value "28." The display 1704 also presents highlight effect 1772B, which specifies the pairing of the second level 1712 and the second communal value 1722. For instance, the highlight effect 1772B is superimposed over at least a portion of the pocket associated with the value "3." Additionally, the display 1704 presents highlight effect 1791B, which specifies the pairing of the third level 1713 and the first terminal-specific value 1731. For instance, the highlight effect 1791B is superimposed over at least a portion of the pocket associated with the value "36." The highlight effect 1791B also specifies (e.g., via the graphic labeled "(T1)") a terminal-specific association with only the first terminal 1741. The display 1704 also presents highlight effect 1792B, which specifies the pairing of the third level 1713 and the second terminal-specific value 1732. For instance, the highlight effect 1792B is superimposed over at least a portion of the pocket associated with the value "0." The highlight effect 1792B also specifies (e.g., via the graphic labeled "(T2)") a terminal-specific association with only the second terminal 1742. Furthermore, the display 1704 presents highlight effect 1793B, which specifies the pairing of the third level 1713 and the third terminal-specific value 1733. For instance, the highlight effect 1793B is superimposed over at least a portion of the pocket associated with the value "5." The highlight effect 1793B also specifies (e.g., via the graphic labeled "(T3)") a terminal-specific association with only the third terminal 1743.

In some embodiments, the croupier terminal 1700 can determine whether or not to present terminal-specific values. For example, the game controller 1710 can randomly select any number of multiplier levels, and multiple selected levels may be terminal-specific. However, each terminal-specific level has a unique value (i.e., non-communal), and thus requires more highlight effects to indicate each separate unique value for all of the different active terminals. For instance, as in FIG. 17, only one of the randomly selected levels (i.e., the third level 1713) was considered as being a terminal-specific level. Because only one level was selected as a terminal-specific level, then the number of highlight effects is limited to five (e.g., two highlight effects 1771B, 1772B associated with the communal levels 1711 and 1712 and three highlight effects 1791B, 1792B, and 1793B associated with the terminal-specific level 1713). However, if more than one level is randomly selected as terminal-specific (e.g., if the game controller 1710 randomly selects, as the multiplier levels, values of "100×," "500×," and "500×" instead of the "100×," "50×," and "500×"), then then croupier terminal 1700 can determine that the display 1704 would have to present seven highlight effects on the wheel 150 (e.g., one highlight effect for the communal "100×" level and six highlight effects for the two terminal-specific "500×" levels). Thus the density of the highlight effects on the wheel 150 would increase as more terminal-specific levels are randomly selected. Presenting a high density of highlight effects on the wheel 150 (via the display 1704) may be distracting or difficult to interpret when viewed from the distance of the player terminals. Hence, the croupier terminal 1700 could determine to prevent presentation of terminal-specific highlights on the wheel 150 (via the display 1704) if the number of selected terminal-specific levels exceeds a limit (e.g., if more than one terminal-specific level is selected). The game controller 1710 can also prevent presentation of highlight effects on the wheel 150 (via the display 1704) if any of the paired layout values for the terminal-specific levels overlap. Instead, the individual player terminals 1741, 1742, and 1743 would present an image of the wheel 150 on each separate display 1701, 1702, and 1703. The separate instances of the image of the wheel 150 would show, for each respective display, only the highlight effects that pertain specifically to that given terminal. Hence, the first display 1701 would present the wheel 150 showing the highlight effects 1771B, 1772B, and 1791B (without the label "(T1)"). The second display 1702 would present the wheel 150 showing the highlight effects 1771B, 1772B, and 1792B (without the label "(T2)"). The third display 1703 would present the wheel 150 showing the highlight effects 1771B, 1772B, and 1793B (without the label "(T3)").

The croupier terminal 1700 can further present a section 1781 that is similar to section 1681 illustrated in FIG. 16. Section 1781 specifies the last five times a winning value was also associated with a multiplier level.

FIG. 2 and FIG. 15, described by way of examples above, represent algorithms that corresponds to at least some instructions stored and executed by the game-logic circuitry associated with any of the systems or devices described for FIG. 1, FIG. 3, FIG. 4, FIG. 5, FIG. 11, FIG. 12, FIG. 13, FIG. 14, FIG. 16, or FIG. 17 to perform the above described functions associated with the disclosed concepts.

Any component of any embodiment described herein may include hardware, software, or any combination thereof.

Further, the operations described herein can be performed in any sensible order. Any operations not required for proper operation can be optional. For example, flow 200 describes at processing block 210 an operation to de-emphasize portions of a roulette wheel. The deemphasizing enables the animation of the selected highlight effect on bet-upon pockets to be more pronounced. However, the animating, at processing block 212, can, in some embodiments, be performed without performing processing block 210. Thus processing block 210 may be considered an optional operation in some embodiments. In another example, some embodiments may animate some highlight effects without animating other highlight effects. For instance, in some embodiments, processing blocks 214, 216, and 218 can be excluded in embodiments that do not include multipliers. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. A method comprising:
  detecting, by a processor associated with a gaming machine, a position at which a token is placed upon a betting layout for a roulette game;
  accepting, by the processor, the token as a bet for the roulette game;
  determining, by the processor based on the position, a bet type for the bet from a plurality of distinct bet types, wherein the plurality of distinct bet types includes at least a single-value bet type and a multi-value bet type;
  selecting, by the processor prior to an outcome of the roulette game and based on the determined bet type, a specific highlight effect from a plurality of different visual highlight effects, wherein each of the plurality of different visual highlight effects has a different shape predefined to visually distinguish a respective one of the plurality of distinct bet types; and
  animating, by the processor, the highlight effect on one or more portions of a roulette wheel associated with one or more bet-upon values for the bet type.

2. The method of claim 1, wherein the one or more portions of the roulette wheel comprise at least a portion of one or more pockets associated with each of the one or more bet-upon values.

3. The method of claim 1, wherein the single-value bet type comprises a straight-up bet on an individual value associated with the roulette wheel and wherein the multi-value bet type comprises a bet on a group of values associated with the roulette wheel.

4. The method of claim 3, wherein the multi-value bet type comprises at least one of an outside bet, an inside bet other than a straight-up bet, a call bet, a Final Bet, a Complete Bet, or an Imprisonment Bet.

5. The method of claim 1, wherein the animating the highlight effect comprises animating the highlight effect as the roulette wheel is spinning.

6. The method of claim 1, wherein the detecting the position at which the token is placed comprises detecting a release of a drag-and-drop user input associated with a virtual object that represents the token.

7. The method of claim 1 further comprising:
randomly selecting a set of values from the betting layout; and
animating, by the processor, a multiplier highlight effect on one or more additional portions of the roulette wheel associated with the set of values.

8. The method of claim 7, further comprising:
determining that one of the set of values coincides with one of the one or more bet-upon values; and
animating a combination effect that combines the highlight effect with the multiplier highlight effect.

9. The method of claim 8, further comprising:
detecting, by the processor, a betting tier selected via user input; and
animating the multiplier highlight effect based on the betting tier.

10. The method of claim 1, wherein the animating the highlight effect is in response to detecting, by the processor, user input of a switch associated with a user interface.

11. The method of claim 1, further comprising deemphasizing, by the processor, portions of the roulette wheel for non-bet-upon values.

12. The method of claim 1, further comprising animating, by the processor, the highlight effect on a portion of the betting layout associated with the one or more bet-upon values.

13. The method of claim 1, further comprising animating, by the processor, the highlight effect on a graphical indication of statistics for the roulette game.

14. The method of claim 13, further comprising animating the highlight effect on the graphical indication of the statistics based on user input received via a player interface associated with the betting layout, wherein the user input indicates a range of past roulette games played.

15. A gaming system comprising:
a display configured to present an image of a roulette wheel for a roulette game; and
a processor configured to execute instructions, which when executed perform operations that cause the gaming system to
detect a position at which a token is placed upon a betting layout for the roulette game;
accept the token as a bet for the roulette game;
determine, based on the position, a bet type for the bet from a plurality of distinct bet types, wherein the plurality of distinct bet types includes at least a single-value bet type and a multi-value bet type;
select, prior to an outcome of the roulette game and based on the determined bet type, a specific highlight effect from a plurality of different visual highlight effects, wherein each of the plurality of different visual highlight effects has a different shape predefined to visually distinguish a respective one of the plurality of distinct bet types; and
animate the highlight effect, via the display, at one or more portions of the roulette wheel associated with one or more bet-upon values for the bet type.

16. The gaming system of claim 15, wherein the one or more portions of the roulette wheel comprise at least a portion of one or more pockets associated with each of the one or more bet-upon values.

17. The gaming system of claim 15, wherein the single-value bet type comprises a straight-up bet on an individual value associated with the roulette wheel, and wherein the multi-value bet type comprises a bet on a group of values associated with the roulette wheel.

18. The gaming system of claim 17, wherein the processor is further configured to execute instructions, which when executed perform operations that cause the gaming system to:
determine that the bet type is the multi-value bet type;
select a border-type highlight that is associated with the multi-value bet type; and
animate the border-type highlight around sections on the roulette wheel that correspond to a plurality of bet-upon values for the multi-value bet type.

19. The gaming system of claim 18, wherein the sections comprise at least two non-contiguous groups of pockets, and wherein the processor is further configured to execute instructions, which when executed perform operations that cause the gaming system to animate at least two non-contiguous border-type highlights to the at least two non-contiguous groups of pockets, wherein the at least two non-contiguous border-type highlights have a same color.

20. A non-transitory machine-readable medium (MRM) storing instructions that, when executed by one or more processors, cause the one or more processors to perform operations comprising:
detecting a position at which a token is placed upon a betting layout for a roulette game;
accepting the token as a bet for the roulette game;
determining, based on the position, a bet type for the bet from a predefined plurality of distinct bet types, wherein the predefined plurality of distinct bet types includes at least a single-value bet type and a multi-value bet type;
selecting, prior to an outcome of the roulette game and based on the determined bet type, a specific highlight effect from a predefined plurality of different visual highlight effects, wherein each of the plurality of different visual highlight effects has a different shape predefined to visually distinguish a respective one of the predefined plurality of distinct bet types;
deemphasizing portions of a roulette wheel for non-bet-upon values by dimming a lighting effect on the portions of the roulette wheel for the non-bet-upon values; and
animating, concurrently with the deemphasizing, the selected specific highlight effect on one or more portions of the roulette wheel associated with one or more bet-upon values for the determined bet type.

21. The non-transitory MRM of claim 20, wherein the different shape includes at least an arrow-type highlight effect and a border-type highlight effect.

\* \* \* \* \*